United States Patent
Su et al.

(10) Patent No.: US 10,425,882 B2
(45) Date of Patent: Sep. 24, 2019

(54) D2D STATION, SYSTEM AND D2D DISCOVERY METHOD

(71) Applicant: Huawei Technologies Co., Ltd., Shenzhen (CN)

(72) Inventors: Hongjia Su, Shanghai (CN); Jun Zhu, Shanghai (CN); Yingpei Lin, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 298 days.

(21) Appl. No.: 15/421,592

(22) Filed: Feb. 1, 2017

(65) Prior Publication Data

US 2017/0142647 A1    May 18, 2017

Related U.S. Application Data

(63) Continuation of application No. PCT/CN2014/083705, filed on Aug. 5, 2014.

(51) Int. Cl.
*H04W 48/16* (2009.01)
*H04W 4/70* (2018.01)
(Continued)

(52) U.S. Cl.
CPC ............ *H04W 48/16* (2013.01); *H04W 4/70* (2018.02); *H04W 8/005* (2013.01); *H04W 88/08* (2013.01); *Y02D 70/00* (2018.01)

(58) Field of Classification Search
None
See application file for complete search history.

(56) References Cited

U.S. PATENT DOCUMENTS

| 8,219,090 B2* | 7/2012 | Hosain | H04W 48/18 |
| | | | 455/432.1 |
| 8,908,562 B2* | 12/2014 | Zhang | H04W 24/02 |
| | | | 370/254 |

(Continued)

FOREIGN PATENT DOCUMENTS

| CN | 103338497 A | 10/2013 |
| CN | 103428817 A | 12/2013 |

(Continued)

OTHER PUBLICATIONS

U.S. Appl. No. 61/711,710, filed Oct. 9, 2012, "Efficient Device Discovery for Direct Communication", Kim et al., p. 1-12.*

(Continued)

*Primary Examiner* — Gregory B Sefcheck
(74) *Attorney, Agent, or Firm* — Slater Matsil, LLP

(57) ABSTRACT

A device-to-device (D2S) station including a receiving module, configured to receive a first DDM that is broadcast by a neighboring station at a first preset power, where the first DDM includes user information of the neighboring station, an obtaining module, configured to obtain information about a link between the D2D station and the neighboring station according to the first DDM received by the receiving module, a time determining module, configured to determine, according to the information that is about the link between the D2D station and the neighboring station and obtained by the obtaining module, a time interval for broadcasting a second DDM, and a sending module, configured to broadcast, at a second preset power, the second DDM at the time interval determined by the time determining module.

20 Claims, 13 Drawing Sheets

(51) Int. Cl.
*H04W 8/00* (2009.01)
*H04W 88/08* (2009.01)

(56) References Cited

U.S. PATENT DOCUMENTS

| | | | | |
|---|---|---|---|---|
| 9,198,137 | B2* | 11/2015 | Koskela | H04W 4/70 |
| 9,288,114 | B2* | 3/2016 | Zhang | H04W 24/02 |
| 9,326,121 | B2* | 4/2016 | Yang | H04W 8/005 |
| 9,345,055 | B2* | 5/2016 | Cho | H04W 8/005 |
| 9,402,254 | B2* | 7/2016 | Kneckt | H04W 72/0446 |
| 9,451,570 | B2* | 9/2016 | Cheng | H04W 8/005 |
| 9,462,567 | B2* | 10/2016 | Johnsson | H04W 64/00 |
| 9,474,101 | B2* | 10/2016 | Zhang | H04W 24/02 |
| 9,554,262 | B2* | 1/2017 | Johnsson | H04W 8/005 |
| 9,686,712 | B2* | 6/2017 | Baek | H04W 48/16 |
| 9,763,128 | B2* | 9/2017 | Huang | H04W 72/12 |
| 9,888,506 | B2* | 2/2018 | Li | H04W 8/005 |
| 9,894,688 | B2* | 2/2018 | Chae | H04W 76/14 |
| 9,918,290 | B2* | 3/2018 | Li | H04W 76/14 |
| 9,924,503 | B2* | 3/2018 | Kim | H04W 8/005 |
| 9,955,408 | B2* | 4/2018 | Novlan | H04W 48/16 |
| 9,992,781 | B2* | 6/2018 | Chatterjee | H04W 76/18 |
| 10,038,993 | B2* | 7/2018 | Lim | H04W 8/005 |
| 10,045,192 | B2* | 8/2018 | Niu | H04W 52/028 |
| 10,142,992 | B2* | 11/2018 | Saiwai | H04W 8/005 |
| 2010/0173628 | A1 | 7/2010 | Hosain et al. | |
| 2012/0269115 | A1 | 10/2012 | Esteves et al. | |
| 2014/0204898 | A1 | 7/2014 | Yang et al. | |
| 2014/0321452 | A1* | 10/2014 | Choi | H04W 8/005 370/350 |
| 2014/0370904 | A1* | 12/2014 | Smith | H04W 8/005 455/450 |
| 2015/0078466 | A1 | 3/2015 | Zhou et al. | |
| 2015/0282132 | A1* | 10/2015 | Kim | H04W 8/005 370/329 |
| 2015/0326362 | A1* | 11/2015 | Xiong | H04W 8/005 370/336 |
| 2016/0007383 | A1* | 1/2016 | Chae | H04W 76/14 455/404.1 |
| 2016/0142898 | A1* | 5/2016 | Poitau | H04W 76/14 370/329 |
| 2016/0198455 | A1* | 7/2016 | Caretti | H04B 17/318 370/329 |
| 2016/0198507 | A1* | 7/2016 | Wu | H04W 76/14 370/330 |
| 2016/0295367 | A1* | 10/2016 | Yu | H04W 8/005 |
| 2018/0109938 | A1* | 4/2018 | Xiong | H04W 8/005 |

FOREIGN PATENT DOCUMENTS

| | | | |
|---|---|---|---|
| CN | 103493422 A | 1/2014 | |
| CN | 103582069 A | 2/2014 | |
| CN | 103702427 A | 4/2014 | |
| WO | WO-2013-162163 | * 10/2013 | H04W 76/02 |
| WO | WO-2013-162193 | * 10/2013 | |
| WO | 2014058221 A2 | 4/2014 | |

OTHER PUBLICATIONS

U.S. Appl. No. 61/752,445, filed Jan. 14, 2013, "Efficient Device Discovery for Direct Communication", Kim et al., p. 1-29.*
U.S. Appl. No. 61/752,917, filed Jan. 15, 2013, "Efficient Device Discovery for Direct Communication", Kim et al., p. 1-90.*
U.S. Appl. No. 61/754,922, filed Jan. 21, 2013, "Beacon Partitioning for Direct Communication", Kim et al., p. 1-8.*

* cited by examiner

| Flag | STA ID | BBS ID | Preferable channel option | Reserved information |

D2D STATION, SYSTEM AND D2D DISCOVERY METHOD

CROSS-REFERENCE TO RELATED APPLICATIONS

This application is a continuation of International Application No. PCT/CN2014/083705, filed on Aug. 5, 2014, the disclosure of which is hereby incorporated by reference in its entirety.

TECHNICAL FIELD

Embodiments of the present invention relate to the communications technologies, and in particular, to a Device-to-device (D2D) station, a system, and a D2D discovery method.

BACKGROUND

Device-to-device (D2D) communication is a technology that enables direct communication between terminal devices. This technology can increase communications system spectral efficiency, reduce transmit powers of terminal devices, and resolve a problem of spectral resource shortage in a wireless communications system to some extent. The D2D technology has already been introduced in a Long Term Evolution (LTE) technology.

D2D discovery is a necessary premise for establishing and completing D2D transmission. That is, a terminal device (such as a D2D station) with a D2D function needs to perform D2D neighbor discovery, to establish a D2D communication link. At present, in a licensed frequency band application scenario, for example, the proximity-based peer-to-peer (P2P) computing communications technology (FlashLinQ) launched by Qualcomm Incorporated, D2D stations all can send and receive a D2D discovery frame on an allocated resource. The resource may be a segment of D2D discovery timeslot. For example, the resource can be divided, by using an orthogonal frequency division multiplexing (OFDM) technology, into multiple orthogonal resources, that are, multiple D2D discovery timeslots at smaller frequency bands. That is, whether performing D2D transmission or not, all the D2D stations need to perform D2D discovery at a fixed period on the allocated resource.

However, in a D2D station discovery manner in the prior art, a D2D station performs D2D discovery at a fixed period, and consequently, energy consumption of the D2D station is relatively large.

SUMMARY

Embodiments of the present invention provide a D2D station, a system, and a D2D discovery method, to resolve a problem, of a D2D station discovery manner in the prior art, that energy consumption of a D2D station is relatively large because the D2D station performs D2D discovery at a fixed period.

According to a first aspect, an embodiment of the present invention provides a D2D station, including a receiving module, configured to receive a first device-to-device D2D discovery message (DDM) broadcast by a neighboring station at a first preset power, where the first DDM includes user information of the neighboring station, an obtaining module, configured to obtain information about a link between the D2D station and the neighboring station according to the first DDM received by the receiving module, a time determining module, configured to determine, according to the information that is about the link between the D2D station and the neighboring station and obtained by the obtaining module, a time interval for broadcasting a second DDM, and a sending module, configured to broadcast, at a second preset power, the second DDM at the time interval determined by the time determining module.

In a first possible implementation manner of the first aspect, the obtaining module includes a calculation unit, configured to calculate quality of the link between the D2D station and the neighboring station according to the user information of the neighboring station that is received by the receiving module, and a storage unit, configured to store, in a D2D neighborhood list DNL of the D2D station, the user information of the neighboring station that is received by the receiving module and the quality of the link between the D2D station and the neighboring station that is obtained by the calculation unit by means of calculation, where neighborhood information in the DNL includes a neighboring member of the D2D station and quality of a link between the D2D station and the neighboring member. The time determining module is configured to determine, according to the neighborhood information in the DNL, the time interval for broadcasting the second DDM.

According to the first possible implementation manner of the first aspect, in a second possible implementation manner, the time determining module includes: a basic time determining unit, configured to determine a basic broadcast time interval at a current moment according to a first time interval and a second time interval that are preset, and the neighborhood information in the DNL, where the basic broadcast time interval at the current moment is between the first time interval and the second time interval, and a broadcast time determining unit, configured to randomly obtain, according to the basic broadcast time interval determined by the basic time determining unit, an actual time interval for broadcasting the second DDM at the current moment.

According to the first aspect or the first possible implementation manner of the first aspect, in a third possible implementation manner, the time determining module includes an initial time interval determining unit and a subsequent time interval determining unit. The initial time interval determining unit is configured to determine an initial time interval for broadcasting the second DDM by the D2D station, and the sending module is further configured to broadcast, at the second preset power, the second DDM at the initial time interval determined by the initial time determining unit. The subsequent time interval determining unit is configured to determine, according to the information that is about the link between the D2D station and the neighboring station and obtained by the obtaining module, a subsequent time interval for broadcasting the second DDM, where when the neighborhood information in the DNL remains unchanged, the determined subsequent time interval is a time interval longer than the initial time interval, and the determined subsequent time interval is between a first time interval and a second time interval that are preset.

According to the third possible implementation manner of the first aspect, in a fourth possible implementation manner, the time determining module further includes a basic time determining unit, configured to determine a basic broadcast time interval at an initial moment and a basic broadcast time interval at a current moment according to the first time interval, the second time interval, and the neighborhood information in the DNL, where when the neighborhood information in the DNL is the same as that at a previous moment, the basic broadcast time interval at the current moment is a time interval longer than the basic broadcast time interval at the initial moment. The initial time interval determining unit is configured to randomly select, from the basic broadcast time interval at the initial moment determined by the basic time determining unit, the initial time interval for broadcasting the second DDM, and the subsequent time interval determining unit is configured to randomly select, from the basic broadcast time interval at the current moment determined by the basic time determining unit, an actual time interval for broadcasting the second DDM at the current moment.

According to the second or the fourth possible implementation manner of the first aspect, in a fifth possible implementation manner, the basic time determining unit is configured to: at any moment at which the second DDM is broadcast, set the basic broadcast time interval to $T^*_d = 2^c \cdot T^*_{d\ min} \leq T^*_{d\ max}$, where $T^*_d$ is the basic broadcast time interval for broadcasting the second DDM by the D2D station, $T^*_{d\ min}$ is the first time interval, $T^*_{d\ max}$ is the second time interval, and c is a counter, where the basic broadcast time interval is between the first time interval and the second time interval, and at the initial moment at which the second DDM is broadcast, when the neighborhood information in the DNL changes compared with that at a previous moment, c is set to 0, or when the neighborhood information in the DNL is the same as that at a previous moment, c is increased by 1.

According to any one of the first aspect or the first to the fifth possible implementation manners of the first aspect, in a sixth possible implementation manner, the first DDM and the second DDM each include: a flag, an identity ID of a station that sends the DDM, an ID of a basic service set BSS to which the station sending the DDM belongs, a preferable channel option of the station that sends the DDM, and reserved information.

According to any one of the first aspect or the first to the sixth possible implementation manners of the first aspect, in a seventh possible implementation manner, the receiving module is further configured to receive a first indication message sent by an access point AP that the D2D station accesses, where the first indication message includes timeslot information of a BSS to which the D2D station belongs. The sending module is configured to send, at the second preset power and only in an uplink timeslot of the BSS according to the first indication message received by the receiving module, the second DDM at the time interval determined by the time determining module.

According to any one of the first aspect or the first to the sixth possible implementation manners of the first aspect, in an eighth possible implementation manner, the second DDM further includes power information of sending the second DDM, the receiving module is further configured to receive a second indication message sent by an AP that the D2D station accesses, the second indication message is an indication message sent to the D2D station according to the power information of the second DDM when the AP receives the second DDM, and the second indication message is used to indicate that the D2D station falls within coverage of the second preset power used by the AP to send data. The D2D station further includes a disabling module, configured to disable a D2D discovery function of the D2D station according to the second indication message received by the receiving module.

According to a second aspect, an embodiment of the present invention provides a D2D discovery system, including a first station, a second station, and an access point AP, where the first station and the second station both are configured to access a basic service set BSS by using the AP. The second station is configured to broadcast a first device-to-device D2D discovery message DDM at a first preset power, where the first DDM includes user information of the second station, the first station is configured to receive the first DDM that is broadcast by the second station, the first station is further configured to obtain information about a link between the first station and the second station according to the received first DDM, the first station is further configured to determine, according to the obtained information about the link between the first station and the second station, a time interval for broadcasting a second DDM, and the first station is further configured to broadcast the second DDM at the determined time interval at a second preset power.

In a first possible implementation manner of the second aspect, that the first station is configured to obtain information about a link between the first station and the second station according to the received first DDM includes: calculating quality of the link between the first station and the second station according to the received user information of the second station; and storing, in a D2D neighborhood list DNL of the first station, the received user information of the second station and the quality of the link between the first station and the second station that is obtained by means of calculation, where neighborhood information in the DNL includes a neighboring member of the first station and quality of a link between the first station and the neighboring member, and that the first station is configured to determine, according to the obtained information about the link between the first station and the second station, a time interval for broadcasting a second DDM includes: determining, according to the neighborhood information in the DNL, the time interval for broadcasting the second DDM.

According to the first possible implementation manner of the second aspect, in a second possible implementation manner, that the first station is configured to determine, according to the obtained information about the link between the first station and the second station, a time interval for broadcasting a second DDM further includes: determining a basic broadcast time interval at a current moment according to a first time interval and a second time interval that are preset, and the neighborhood information in the DNL, where the basic broadcast time interval at the current moment is between the first time interval and the second time interval; and randomly obtaining, according to the determined basic broadcast time interval, an actual time interval for broadcasting the second DDM at the current moment.

According to the second aspect or the first possible implementation manner of the second aspect, in a third possible implementation manner, that the first station is further configured to determine, according to the obtained information about the link between the first station and the second station, a time interval for broadcasting a second DDM further includes: at an initial moment at which the second DDM is broadcast, determining an initial time interval for broadcasting the second DDM, where correspondingly, the first station is configured to broadcast the second DDM at the determined initial time interval at the second preset power. At a subsequent moment at which the second DDM is broadcast, determining, according to the obtained information about the link between the first station and the second station, a subsequent time interval for broadcasting the second DDM, where when the neighborhood information in the DNL remains unchanged, the determined subsequent time interval is a time interval longer than the initial time interval, and the determined subsequent time interval is between a first time interval and a second time interval that are preset.

According to the third possible implementation manner of the second aspect, in a fourth possible implementation manner, the first station is further configured to determine a basic broadcast time interval at the initial moment and a basic broadcast time interval at a current moment according to the first time interval, the second time interval, and the neighborhood information in the DNL, where when the neighborhood information in the DNL is the same as that at a previous moment, the basic broadcast time interval at the current moment is a time interval longer than the basic broadcast time interval at the initial moment, correspondingly, that at an initial moment at which the second DDM is broadcast, the first station is configured to determine an initial time interval for broadcasting the second DDM includes: randomly selecting, from the determined basic broadcast time interval at the initial moment, the initial time interval for broadcasting the second DDM, and that at a subsequent moment at which the second DDM is broadcast, the first station is configured to determine, according to the obtained information about the link between the first station and the second station, a subsequent time interval for broadcasting the second DDM includes: randomly selecting, from the determined basic broadcast time interval at the current moment, an actual time interval for broadcasting the second DDM at the current moment.

According to the second or the fourth possible implementation manner of the second aspect, in a fifth possible implementation manner, that the first station determines the basic broadcast time interval according to the first time interval, the second time interval, and the neighborhood information in the DNL includes: at any moment at which the second DDM is broadcast, setting the basic broadcast time interval to $T^*_d = 2^c \cdot T^*_{d\ min} \leq T^*_{d\ max}$, where $T^*_d$ is the basic broadcast time interval for broadcasting the second DDM by the first station, $T^*_{d\ min}$ is the first time interval, and $T^*_{d\ max}$ is the second time interval, where the basic broadcast time interval is between the first time interval and the second time interval, the first station is further configured to count c, and at the initial moment at which the second DDM is broadcast, when the neighborhood information in the DNL changes compared with that at a previous moment, the first station sets c to 0, or when the neighborhood information in the DNL is the same as that at a previous moment, the first station increases c by 1.

According to any one of the second aspect or the first to the fifth possible implementation manners of the second aspect, in a sixth possible implementation manner, the first DDM and the second DDM each include: a flag, an identity ID of a station that sends the DDM, an ID of a basic service set BSS to which the station sending the DDM belongs, a preferable channel option of the station that sends the DDM, and reserved information.

According to any one of the second aspect or the first to the sixth possible implementation manners of the second aspect, in a seventh possible implementation manner, the AP is configured to separately send a first indication message to the first station and the second station, where the first indication message includes timeslot information of a BSS to which the first station and the second station belong. The first station and the second station are further separately configured to receive the first indication message, that the second station is configured to broadcast a first DDM at a first preset power includes: sending, only in an uplink timeslot of the BSS, the first DDM according to the first indication message at the first preset power, and that the first station is configured to broadcast the second DDM at the determined time interval at a second preset power includes: sending, only in the uplink timeslot of the BSS according to the first indication message, the second DDM at the determined time interval at the second preset power.

According to any one of the second aspect or the first to the sixth possible implementation manners of the second aspect, in an eighth possible implementation manner, the first DDM and the second DDM each further include power information of sending the DDM. The AP is further configured to: receive the first DDM sent by the second station, send a second indication message to the second station according to the power information of the first DDM, receive the second DDM sent by the first station, and send a third indication message to the first station according to the power information of the second DDM, where the second indication message is used to indicate that the second station falls within coverage of the first preset power used by the AP to send data, and the third indication message is used to indicate that the first station falls within coverage of the second preset power used by the AP to send data. Correspondingly, the second station is further configured to receive the second indication message sent by the AP, and disable a D2D discovery function of the second station according to an indication of the second indication message, and the first station is further configured to receive the third indication message sent by the AP, and disable a D2D discovery function of the first station according to an indication of the third indication message.

According to a third aspect, an embodiment of the present invention provides a D2D discovery method, including receiving, by a first station, a first device-to-device D2D discovery message DDM that is broadcast by a second station at a first preset power, where the DDM includes user information of the second station, obtaining, by the first station, information about a link between the first station and the second station according to the first DDM, determining, by the first station according to the obtained information about the link between the first station and the second station, a time interval for broadcasting a second DDM, and broadcasting, by the first station, the second DDM at the determined time interval at a second preset power.

In a first possible implementation manner of the third aspect, the obtaining, by the first station, information about a link between the first station and the second station according to the first DDM includes calculating, by the first station, quality of the link between the first station and the second station according to the user information of the second station, and storing, by the first station, in a D2D neighborhood list DNL of the first station, the user information of the second station and the quality of the link between the first station and the second station that is obtained by means of calculation, where neighborhood information in the DNL includes a neighboring member of the first station and quality of a link between the first station and the neighboring member. The determining, by the first station according to the obtained information about the link between the first station and the second station, a time interval for broadcasting a second DDM includes determining, by the first station according to the neighborhood information in the DNL, the time interval for broadcasting the second DDM.

According to the first possible implementation manner of the third aspect, in a second possible implementation manner, the determining, by the first station according to the obtained information about the link between the first station and the second station, a time interval for broadcasting a second DDM includes determining, by the first station, a basic broadcast time interval at a current moment according to a first time interval and a second time interval that are preset, and the neighborhood information in the DNL, where the basic broadcast time interval at the current moment is between the first time interval and the second time interval, and randomly obtaining, by the first station according to the determined basic broadcast time interval, an actual time interval for broadcasting the second DDM at the current moment.

According to the third aspect or the first possible implementation manner of the third aspect, in a third possible implementation manner, the method further includes determining, by the first station at an initial moment at which the second DDM is broadcast, an initial time interval for broadcasting the second DDM, and broadcasting the second DDM at the determined initial time interval at the second preset power, and the determining, by the first station according to the obtained information about the link between the first station and the second station, a time interval for broadcasting a second DDM includes determining, by the first station, at a subsequent moment at which the second DDM is broadcast, according to the obtained information about the link between the first station and the second station, a subsequent time interval for broadcasting the second DDM, where when the neighborhood information in the DNL remains unchanged, the determined subsequent time interval is a time interval longer than the initial time interval, and the determined subsequent time interval is between a first time interval and a second time interval that are preset.

According to the third possible implementation manner of the third aspect, in a fourth possible implementation manner, the method further includes: before determining the initial time interval for broadcasting the second DDM, determining, by the first station, a basic broadcast time interval at the initial moment according to the first time interval, the second time interval, and the neighborhood information in the DNL, and before determining the subsequent moment at which the second DDM is broadcast, determining, by the first station, a basic broadcast time interval at a current moment according to the first time interval, the second time interval, and the neighborhood information in the DNL, where when the neighborhood information in the DNL is the same as that at a previous moment, the basic broadcast time interval at the current moment is a time interval longer than the basic broadcast time interval at the initial moment. Correspondingly, the determining, by the first station at an initial moment at which the second DDM is broadcast, an initial time interval for broadcasting the second DDM includes: randomly selecting, by the first station, the initial time interval for broadcasting the second DDM from the determined basic broadcast time interval at the initial moment, and the determining, by the first station, at a subsequent moment at which the second DDM is broadcast, according to the obtained information about the link between the first station and the second station, a subsequent time interval for broadcasting the second DDM includes: randomly selecting an actual time interval for broadcasting the second DDM at the current moment from the determined basic broadcast time interval at the current moment.

According to the second or the fourth possible implementation manner of the third aspect, in a fifth possible implementation manner, the determining, by the first station, the basic broadcast time interval according to the first time interval, the second time interval, and the neighborhood information in the DNL includes: setting, by the first station at any moment at which the second DDM is broadcast, the basic broadcast time interval to $T^*_d = 2^c \cdot T^*_{d\ min} \leq T^*_{d\ max}$, where $T^*_d$ is the basic broadcast time interval for broadcasting the second DDM by the first station, $T^*_{d\ min}$ is the first time interval, $T^*_{d\ max}$ is the second time interval, and c is a counter, where the basic broadcast time interval is between the first time interval and the second time interval, and at the initial moment at which the second DDM is broadcast, when the neighborhood information in the DNL changes compared with that at a previous moment, c is set to 0, or when the neighborhood information in the DNL is the same as that at a previous moment, c is increased by 1.

According to any one of the third aspect or the first to the fifth possible implementation manners of the third aspect, in a sixth possible implementation manner, the first DDM and the second DDM each include: a flag, an identity ID of a station that sends the DDM, an ID of a basic service set BSS to which the station sending the DDM belongs, a preferable channel option of the station that sends the DDM, and reserved information.

According to the third aspect or the first to the sixth possible implementation manners of the third aspect, in a seventh possible implementation manner, the method further includes receiving, by the first station, a first indication message sent by an access point AP that the first station accesses, where the first indication message includes timeslot information of a BSS to which the first station belongs, and the broadcasting, by the first station, the second DDM at the determined time interval at a second preset power includes: sending, by the first station only in an uplink timeslot of the BSS according to the first indication message, the second DDM at the determined time interval at the second preset power.

According to any one of the third aspect or the first to the sixth possible implementation manners of the third aspect, in an eighth possible implementation manner, the second DDM further includes power information of sending the second DDM. The method further includes: receiving, by the first station, a second indication message sent by an AP that the first station accesses, where the second indication message is an indication message sent to the first station according to the power information of the second DDM when the AP receives the second DDM, and the second indication message is used to indicate that the first station falls within coverage of the second preset power used by the AP to send data, and disabling, by the first station, a D2D discovery function of the first station according to the second indication message.

According to the D2D station, the system, and the D2D discovery method provided in the embodiments of the present invention, a first DDM that is broadcast by a neighboring station at a first preset power is received; information about a link between a D2D station and the neighboring station is obtained according to user information in the first DDM; a time interval for broadcasting a second DDM by the D2D station is dynamically adjusted according to the information about the link between the D2D station and the neighboring station; and the second DDM is broadcast at the determined time interval. This implements that a D2D station dynamically adjusts, according to neighborhood information in coverage of a transmit power of the D2D station, a time interval for broadcasting a second DDM; resolves a problem, of a D2D station discovery manner in the prior art, that energy consumption of the D2D station is relatively large because the D2D station performs D2D discovery at a fixed period; and correspondingly improves discovery efficiency of the D2D station.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Embodiment 1

Figure 1:
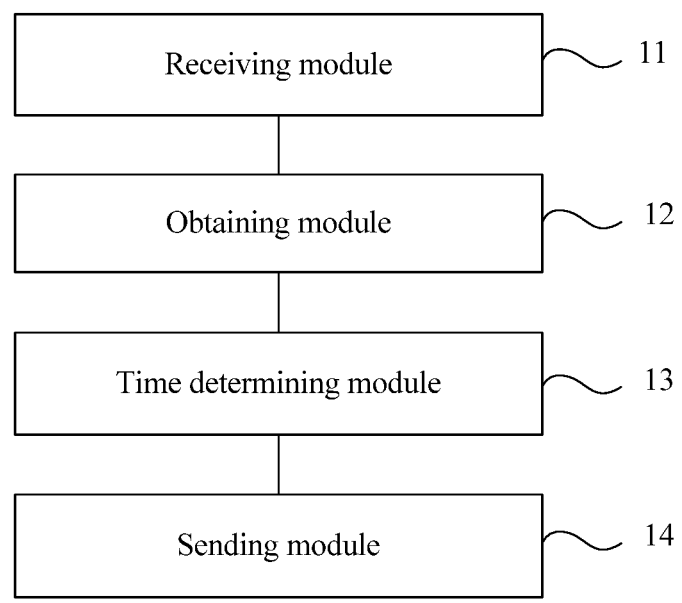
FIG. 1 is a schematic structural diagram of a D2D station according to Embodiment 1 of the present invention.

FIG. 1 is a schematic structural diagram of a D2D station according to Embodiment 1 of the present invention. The D2D station in this embodiment is applicable to performing D2D discovery. The D2D station may be implemented in a manner of hardware and software, which may be integrated into a memory of the D2D station, for example, integrated into a processor chip, for being invoked and executed by a processor. The D2D station in this embodiment includes: a receiving module 11, an obtaining module 12, a time determining module 13, and a sending module 14.

The receiving module 11 is configured to receive a first DDM that is broadcast by a neighboring station at a first preset power, where the first DDM includes user information of the neighboring station.

In a current Wireless Fidelity (Wi-Fi) network environment, floating of a D2D station that accesses a basic service set (BSS) by using an access point (AP) is relatively small. In addition, to adapt to high-density users and high throughputs in the Wi-Fi network, D2D communication is usually used between D2D stations. That is, the D2D stations are allowed to reuse cell resources to directly perform communication. Such a D2D communication manner can increase wireless communications system spectral efficiency, reduce transmit powers of the D2D stations, and resolve a problem of wireless communications system spectral resource shortage to some extent. It should be noted that the station described in this embodiment and stations applied in this embodiment, that are, station (STA) 1 to STA9, are stations with a D2D function, that are, stations that can perform D2D discovery.

Figures 2, 3:
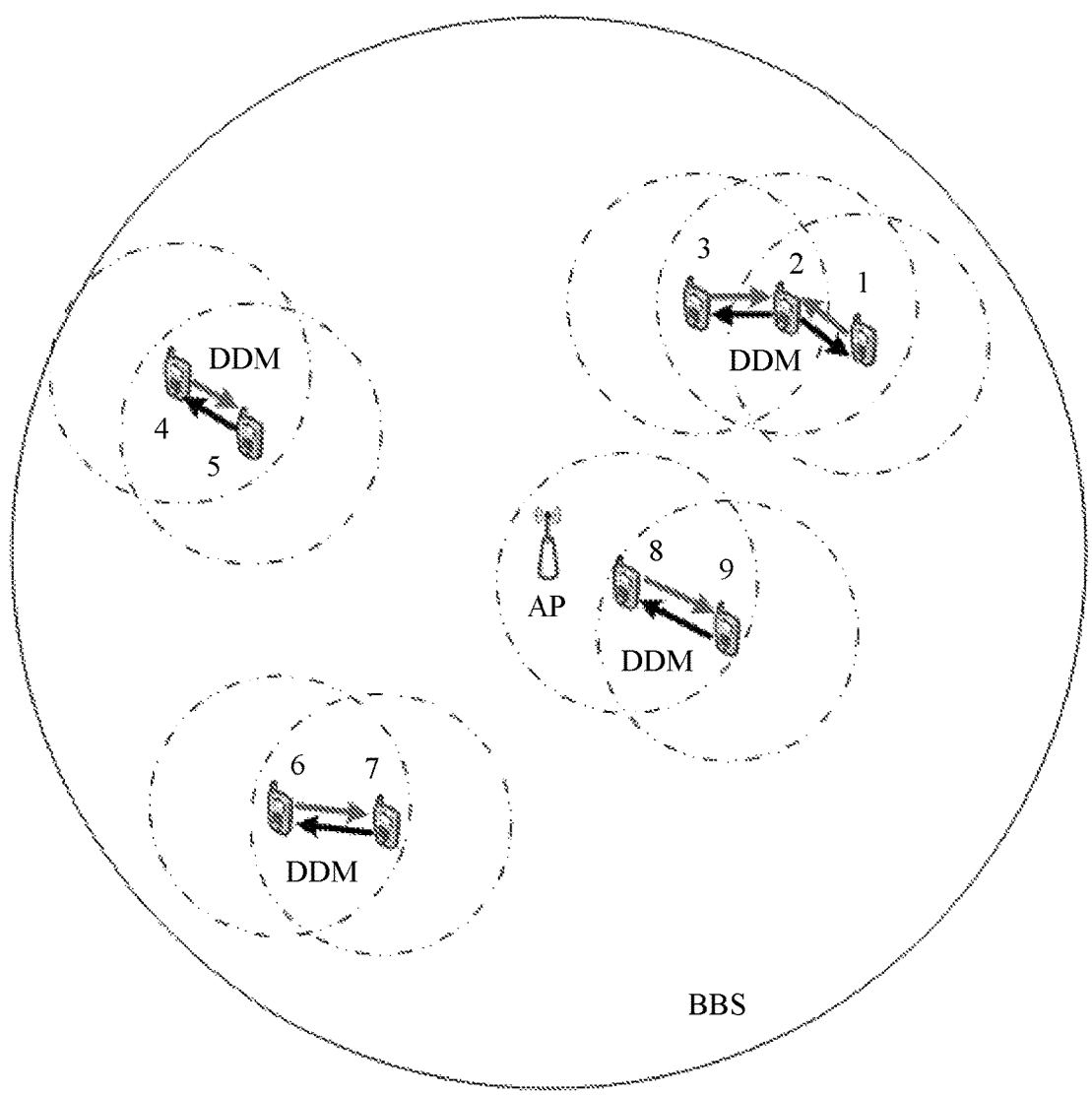
FIG. 2 is a schematic diagram of a D2D station, according to the embodiment shown in FIG. 1, in a BSS architecture.
FIG. 3 is a schematic diagram of a DDM format according to the embodiment shown in FIG. 1.

In this embodiment, the receiving module 11 of the D2D station receives the first DDM sent by a neighboring station in a BSS. The neighboring station generally sends the first DDM at the first preset power, so that another D2D station within coverage of a transmit power of the neighboring station can receive the first DDM sent by the neighboring station. As shown in FIG. 2, FIG. 2 is a schematic diagram of the D2D station, according to the embodiment shown in FIG. 1, in a BSS architecture. It can be seen that STA1 to STA9 all have relatively small coverage, and all fall within coverage of the BSS. Performing D2D discovery within a small range between D2D stations helps save resources. That is, the neighboring station in this embodiment can send the first DDM message at the first preset power. For example, a normal transmit power used when a station sends data information does not exceed 23 dBm, and the station generally sends data information by using a maximum power, that is, 23 dBm. In this embodiment, the first preset power used by the neighboring station to send the first DDM is a relatively small transmit power that can ensure D2D discovery performed within a relatively small range. Generally, the first preset power may be 40% to 50% of the foregoing normal transmit power. For example, in this embodiment, the first preset power of the neighboring station may be 13 dBm. For another example, a coverage diameter of the first preset power may be ¼ of a coverage diameter of the BSS.

It should be noted that there may be one or more neighboring stations in this embodiment. Therefore, the D2D station provided in this embodiment may receive one or more first DDMs. All stations that fall within coverage of a transmit power of the D2D station are the neighboring stations. For example, as shown in FIG. 2, the STA2 is the D2D station provided in this embodiment, and the STA2 falls within coverage of transmit powers of the STA1 and the STA3. Therefore, the STA2 can separately receive first DDM messages sent by the STA1 and the STA3. That is, both the STA1 and the STA3 are the neighboring stations in this embodiment. In addition, in this embodiment, a receiving party and a sending party of a first DDM can be mutually replaceable. That is, the STA2 may be the D2D station that receives the first DDM, or may be the neighboring station that sends the first DDM.

The obtaining module 12 is configured to obtain information about a link between the D2D station and the neighboring station according to the first DDM received by the receiving module 11.

In this embodiment, for the multiple stations that perform D2D discovery, a discoverer, that is, a message receiving party, needs to learn information about links between the discover and all discovered parties, that are, message sending parties. Specifically, the D2D station obtains the information about the link between the D2D station and the neighboring station according to the user information of the neighboring station in the DDM received by the receiving module 11.

For example, FIG. 3 is a schematic diagram of a DDM format according to the embodiment shown in FIG. 1. As shown in FIG. 3, the DDM may include a flag (Flag), an STA ID (Identity, identity), a BSS ID, a preferable channel option, and reserved information (Reserved). Specifically, the flag, generally with a length of 1 bit (bit), is used to indicate that a DDM needs to be read by a station with a D2D function and that a station with no D2D function may directly discard this signaling. The STA ID represents an identity of a station with a D2D function that sends the DDM, for example, the STA ID may be a Media Access Control (MAC) address of the station with a D2D function, and a length of the MAC address is 48 bits. The BSS ID represents an identity of a BSS to which the station with a D2D function sending the DDM belong, for example, the BSS ID may be a MAC address of the BSS, and a length of the MAC address is 48 bits. The Preferable Channel Options represent information about a frequency band that the station with a D2D function can effectively use, and the information is used by the station with a D2D function to select another frequency band, except a frequency band in which a DDM is sent, to perform subsequent data transmission, and each of the frequency bands, excluding the frequency band of the BSS that the station accesses, may be represented by 8 bits. The Reserved represents reserved information, which may be additionally added according to a need, and may be, for example, a link status of the STA that sends the DDM.

The time determining module 13 is configured to determine, according to the information that is about the link between the D2D station and the neighboring station and obtained by the obtaining module 12, a time interval for broadcasting a second DDM.

In this embodiment, the obtaining module 12 already learns user information of all neighboring stations within coverage of the transmit power of the D2D station, and information about links between the D2D station and all the neighboring stations. All the neighboring stations within the coverage of the transmit power of the D2D station are neighboring members of the D2D station. The neighboring members of the D2D station and the information about the links between the D2D station and all the neighboring members are a neighboring environment of the D2D station. The time determining module 13 determines the time interval of the to-be-broadcast second DDM according to the neighboring environment of the D2D station. Specifically, a more stable neighboring environment of the D2D station indicates a longer time interval for broadcasting the second DDM; and a less stable neighboring environment of the D2D station indicates a shorter time interval for broadcasting the second DDM. Therefore, the time interval for broadcasting the second DDM adapts to the neighboring environment of the D2D station, so that when the neighboring environment is stable, a broadcasting frequency is reduced, to decrease energy consumption of the D2D station; when the neighboring environment changes, the neighboring station within the coverage of the transmit power of the D2D station can discover the D2D station, to ensure reliability of D2D discovery.

It should be noted that the DDM shown in FIG. 3 may be the first DDM received by the D2D station in this embodiment, or may be the second DDM sent by the D2D station. Formats of DDMs broadcast by all D2D stations in the BSS during D2D discovery are the same.

The sending module 14 is configured to broadcast, at a second preset power, the second DDM at the time interval determined by the time determining module 13.

In this embodiment, after the time determining module 13 determines the time interval for broadcasting the second DDM, the second DDM is sent when a next broadcast moment reaches, and is sent at the second preset power. A value of the second preset power may be obtained in a same manner as that of the first preset power. For example, the second preset power may be 40% to 50% of a normal transmit power used when a sending party, that is, the D2D station, for the second DDM, sends data information. For another example, a coverage diameter of the second preset power may be ¼ of the coverage diameter of the BSS. In the prior art, all D2D stations need to perform DDM discovery at a fixed period on an allocated resource. In addition, the prior-art discovery process requires high degree of time synchronization, which results in relatively large energy consumption of the D2D station and low discovery efficiency. In this embodiment, to ensure that, when neighboring members within coverage of a transmit power of the D2D station changes, a new neighboring member can discover the D2D station, and implement D2D discovery between the neighboring station and the D2D station, although broadcasting of the second DDM is also performed in a repeated manner in this embodiment, different from the prior art, in this embodiment, a time interval for broadcasting the second DDM is not a preset fixed time interval but is dynamically adjusted as the neighboring environment of the D2D station changes. In this way, a process in which the D2D station performs D2D discovery better adapts to an environment change in the BSS, which can implement efficient D2D discovery and reduce energy consumption of the D2D station.

It should be noted that in this embodiment, the second preset power used by the D2D station to send the second DDM may be the same as or different from the first preset power used by the neighboring station to send the first DDM.

The D2D station provided in this embodiment receives a first DDM that is broadcast by a neighboring station at a first preset power; obtains information about a link between the D2D station and the neighboring station according to user information in the first DDM; dynamically determines, according to the information about the link between the D2D station and the neighboring station, a time interval for broadcasting a second DDM by the D2D station; and broadcasts the second DDM at the determined time interval. This implements that a D2D station dynamically determines, according to neighborhood information in coverage of a transmit power of the D2D station, a time interval for broadcasting a second DDM; resolves a problem, of a D2D station discovery manner in the prior art, that energy consumption of the D2D station is relatively large because the D2D station performs D2D discovery at a fixed period; and correspondingly improves discovery efficiency of the D2D station.

Embodiment 2

Figure 4:
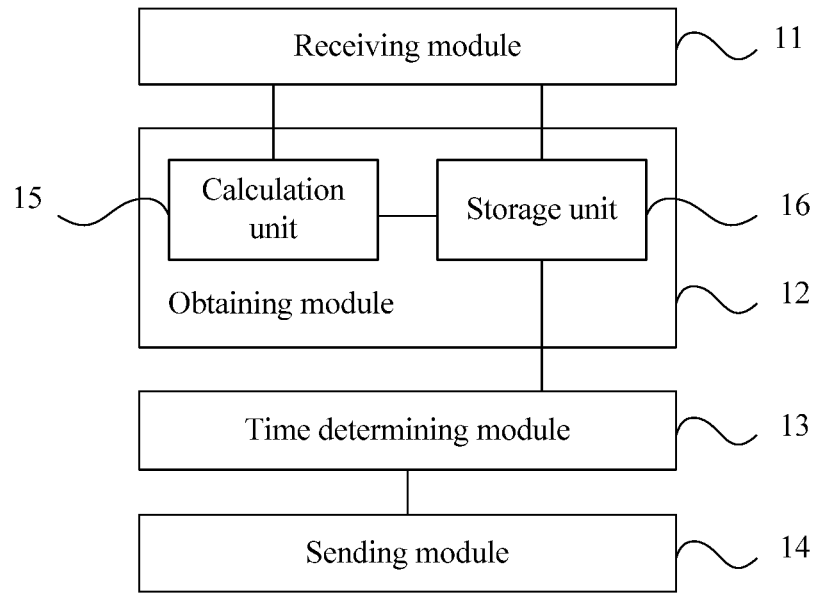
FIG. 4 is a schematic structural diagram of a D2D station according to Embodiment 2 of the present invention.

FIG. 4 is a schematic structural diagram of a D2D station according to Embodiment 2 of the present invention. On a basis of the structure of the D2D station provided in the embodiment shown in FIG. 1, in the D2D station provided in this embodiment, the obtaining module 12 includes: a calculation unit 15, configured to calculate quality of the link between the D2D station and the neighboring station according to the user information of the neighboring station that is received by the receiving module 11; and a storage unit 16, configured to store, in a D2D neighborhood list (DNL) of the D2D station, the user information of the neighboring station that is received by the receiving module 11 and the quality of the link between the D2D station and the neighboring station that is obtained by the calculation unit 15 by means of calculation, where neighborhood information in the DNL includes neighboring members of the D2D station and quality of a link between the D2D station and each neighboring member. Correspondingly, the time determining module 13 is configured to determine, according to the neighborhood information in the DNL, the time interval for broadcasting the second DDM.

For example, referring to FIG. 2, a DNL of an STA2 may be shown in Table 1 as follows:

TABLE 1

| STA ID | AP ID | Link Quality (Link Quality) |
|--------|-------|------------------------------|
| STA1   | AP    | Q1                           |
| STA3   | AP    | Q2                           |

Specifically, after accessing an AP and performing D2D discovery, the STA2 has two neighboring members STA1 and STA3. The two neighboring members both access the AP. Q1 and Q2 respectively represent link quality of the neighboring members STA1 and STA3.

In this embodiment, specifically, the user information of the neighboring station and the quality of the link between the D2D station and the neighboring station that is obtained by means of calculation are stored in a preset DNL. The DNL may include all neighboring stations, of the D2D station, within coverage of the second preset power, that is, include the neighboring members of the D2D station, and the quality of the link between the D2D station and each neighboring member. Therefore, the DNL can provide relatively accurate D2D link information, which helps the D2D station determine a neighboring environment of the D2D station, and can assist the AP in resource scheduling.

For example, neighboring members in a DNL of a D2D station numbered n may be represented as: $K_n = \{STA_1, STA_2, \ldots, STA_m\}$, where 1, 2, ..., m (m≠n) are numbers of the neighboring members in the DNL. The neighboring members in the DNL of the D2D station may be empty, that is, $K_n \in \phi$. Generally, stability of a neighboring environment of the D2D station is reflected by neighborhood information in the DNL. That is, if the neighboring members of the D2D station do not change, the neighboring environment of the D2D station is stable. Accordingly, if the neighboring members of the D2D station change, the neighboring environment of the D2D station is unstable.

It should be noted that in this embodiment, when the sending module 14 of the D2D station broadcasts the second D2D for a first time, there is no neighboring member in the DNL of the D2D station. The D2D station broadcasts the second DDM at an initial time interval determined by the time determining module 13.

Figure 5:
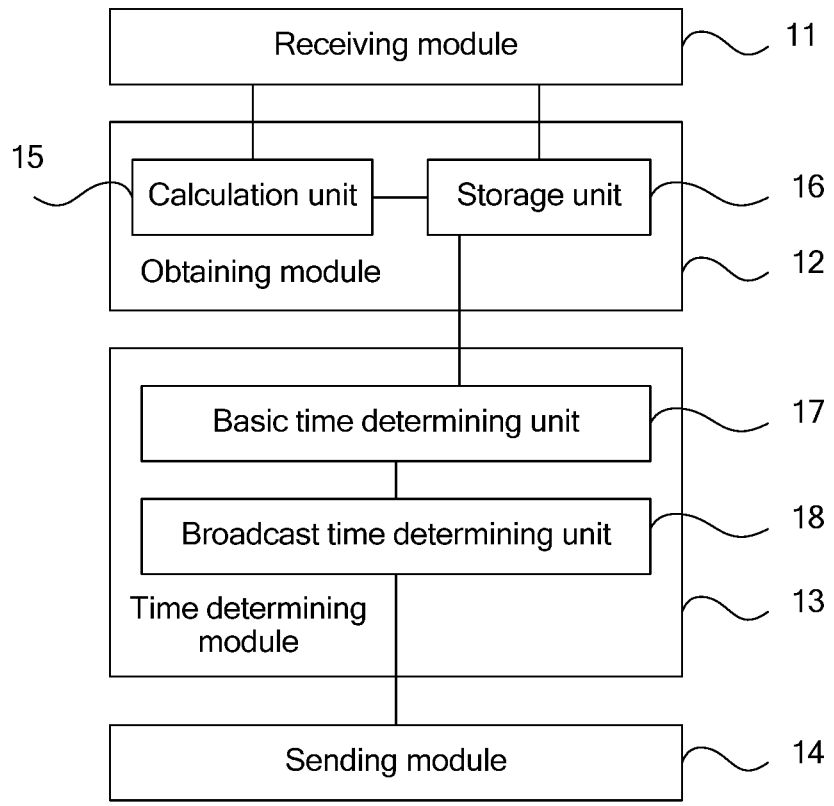
FIG. 5 is a schematic structural diagram of another D2D station according to an embodiment of the present invention.

Optionally, FIG. 5 is a schematic structural diagram of another D2D station according to this embodiment of the present invention. On a basis of the structure of the D2D station provided in the embodiment shown in FIG. 4, in the D2D station provided in this embodiment, the time determining module 13 may include, for example, a basic time determining unit 17, configured to determine a basic broadcast time interval at a current moment according to a first time interval and a second time interval that are preset, and the neighborhood information in the DNL, where the basic broadcast time interval at the current moment is between the first time interval and the second time interval; and a broadcast time determining unit 18, configured to randomly obtain, according to the basic broadcast time interval determined by the basic time determining unit 17, an actual time interval for broadcasting the second DDM at the current moment.

Figure 6:
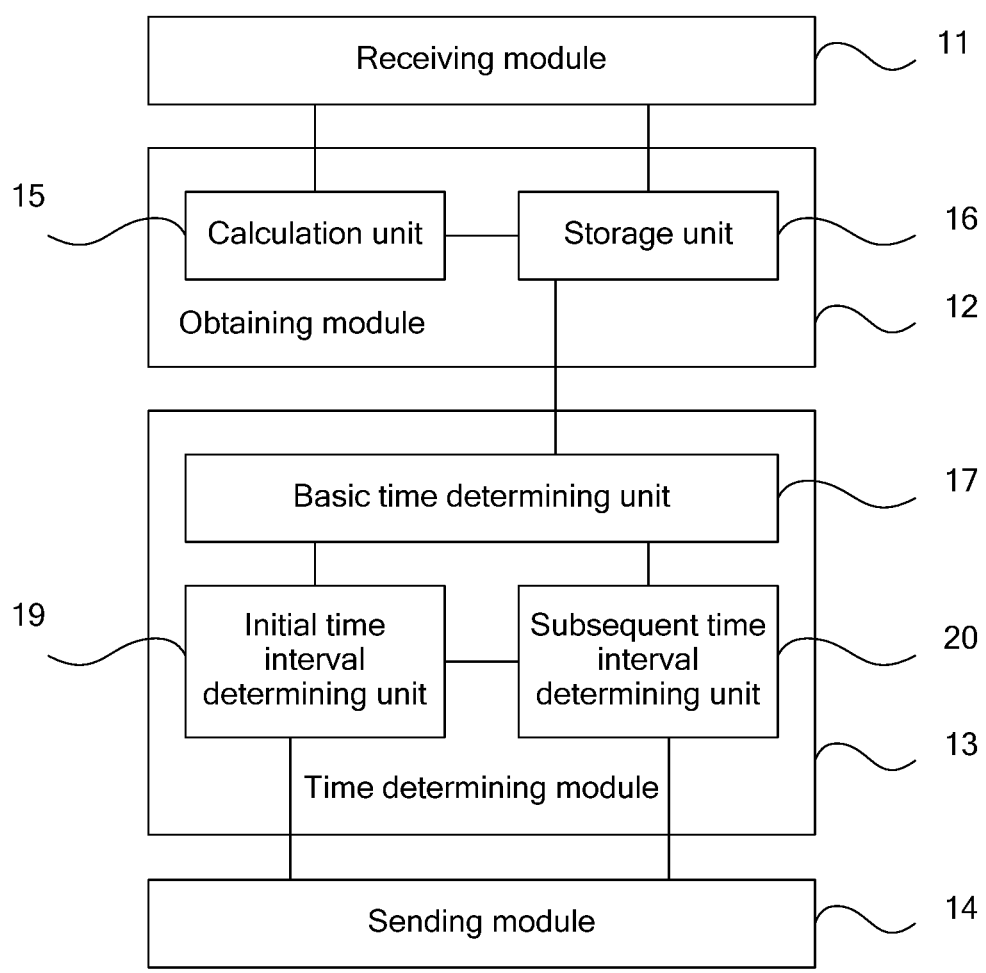
FIG. 6 is a schematic structural diagram of still another D2D station according to an embodiment of the present invention.

FIG. 6 is a schematic structural diagram of still another D2D station according to this embodiment of the present invention. Still on a basis of the structure of the D2D station provided in the embodiment shown in FIG. 4, in this embodiment, the time determining module 13 may include: an initial time interval determining unit 19 and a subsequent time interval determining unit 20. The initial time interval determining unit 19 is configured to determine an initial time interval for broadcasting the second DDM by the D2D station. The sending module 14 is further configured to broadcast, at the second preset power, the second DDM at the initial time interval determined by the initial time interval determining unit 19. The subsequent time interval determining unit 20 is configured to determine, according to the information that is about the link between the D2D station and the neighboring station and obtained by the obtaining module 12, a subsequent time interval for broadcasting the second DDM, where when the neighborhood information in the DNL remains unchanged, the determined subsequent time interval is a time interval longer than the initial time interval, and the determined subsequent time interval is between a first time interval and a second time interval that are preset.

It should be noted that in the embodiment shown in FIG. 5 and FIG. 6, a minimum broadcast time interval for broadcasting a DDM is the first time interval or is obtained according to the first time interval. A maximum broadcast time interval for broadcasting a DDM is the second time interval or is obtained according to the second time interval. The minimum broadcast time interval and the maximum broadcast time interval are usually selected according to empirical values. An extremely small time interval for broadcasting a DDM results in that the D2D station sends a DDM frequently, which causes relatively large energy consumption of the D2D station. An extremely large time interval for broadcasting a DDM results in that the D2D station does not perform D2D discovery when a neighboring member is already changed, which reduces reliability of D2D discovery.

Similar to the embodiment shown in FIG. 5, in the embodiment shown in FIG. 6, the time determining module 13 may also include a basic time determining unit 17, configured to determine a basic broadcast time interval at an initial moment and a basic broadcast time interval at a current moment according to the first time interval, the second time interval, and the neighborhood information in the DNL, where when the neighborhood information in the DNL is the same as that at a previous moment, the basic broadcast time interval at the current moment is a time interval longer than the basic broadcast time interval at the initial moment. Correspondingly, the initial time interval determining unit 19 is configured to randomly select, from the basic broadcast time interval at the initial moment determined by the basic time determining unit 17, the initial time interval for broadcasting the second DDM. The subsequent time interval determining unit 20 is configured to randomly select, from the basic broadcast time interval at the current moment determined by the basic time determining unit 17, an actual time interval for broadcasting the second DDM at the current moment.

An example is used to describe specific manners of determining the basic broadcast time interval and the actual time interval for sending the second DDM in the embodiment shown in FIG. 5 and FIG. 6. The basic time determining unit 17 is configured to set, at any moment at which the second DDM is broadcast, the basic broadcast time interval to $T^*_d = 2^c \cdot T^*_{d\ min} \leq T^*_{d\ max}$. $T^*_d$ is the basic broadcast time interval for broadcasting the second DDM by the D2D station, $T^*_{d\ min}$ is the first time interval, $T^*_{d\ max}$ is the second time interval, and c is a counter, where the basic broadcast time interval is between the first time interval and the second time interval. It should be noted that at the initial moment at which the second DDM is broadcast, when the neighborhood information in the DNL changes compared with that at a previous moment, c is set to 0; or when the neighborhood information in the DNL is the same as that at a previous moment, c is increased by 1. Specially, a case in which c is 0 includes the following. On one hand, the initial time interval determining unit 19 is configured to, at the initial moment at which the second DDM is broadcast, randomly obtain, according to the basic broadcast time interval $T^*_d = T^*_{d\ min}$ determined by the basic time determining unit 17, the initial time interval for broadcasting the second DDM at the initial moment. On the other hand, at a subsequent moment at which the second DDM is broadcast, both the broadcast time determining unit 18 and the subsequent time interval determining unit 20 are configured to: when the neighborhood information in the DNL changes compared with that at a previous moment, separately randomly obtain, according to the basic broadcast time interval $T^*_d = T^*_{d\ min}$ that is determined by the basic time determining unit 17 of the respective D2D stations, the actual time interval for broadcasting the second DDM at the current moment.

The following uses a specific example to describe a process in which the D2D station uses $T^*_d$ as the basic broadcast time interval to perform D2D discovery in the embodiments of the present invention. $T^*_d$ ranges from the minimum broadcast time interval $T^*_{d\ min}$ to the maximum broadcast time interval $T^*_{d\ max}$, that is, $T^*_d \in [T^*_{d\ min}, T^*_{d\ max}]$. In this embodiment, a specific procedure in which the D2D station performs D2D discovery may be as follows.

At a first moment, that is, a moment (t), at which the second DDM is broadcast, the basic broadcast time interval of the D2D station may be set to $T^*_d = T^*_{d\ min}$; and a value $T_d$ is randomly selected from $[T^*_d/2, T^*_d]$ as an initial time interval for broadcasting the second DDM at the first moment (t), that is, $T_d^t \in [T^*_d/2, T^*_d]$. For example, if $T^*_{d\ min}$ is 1 second (s), and $T^*_{d\ max}$ is 10 s, $T_d^t \in [0.5, 1]$, and $T_d^t$ may be, for example, 0.7 s.

It should be noted that all the D2D stations in the BSS can broadcast a DDM in such a manner. Therefore, in the embodiments of the present invention, a purpose of determining the basic broadcast time interval according to a minimum broadcast time interval, a maximum broadcast time interval, and neighborhood information in a DNL, and randomly selecting an initial time interval for broadcasting the second DDM according to the basic broadcast time interval lies in: when multiple D2D stations broadcast DDMs simultaneously, a conflict caused because the multiple D2D stations broadcast the DDMs at a same time interval can be effectively avoided, and interference that may exist during a D2D discovery process can be reduced. At the first moment (t), that is, at the initial moment at which the second DDM is broadcast, determining of an initial time interval for broadcasting the second DDM may also be executed according to the foregoing solution provided in this embodiment. Specifically, to avoid a conflict of broadcast moments, a D2D station that joins the BSS does not directly broadcast the second DDM immediately, and may calculate $T_d$ first. For example, after the D2D station joins the BSS, timing is started from 0 s, and the second DDM is not broadcast immediately at 0 s. The initial time interval $T_d$ calculated by the D2D station is 0.7 s, and the second DDM may be broadcast after 0.7 s elapses. That is, a first broadcast moment (t) is at 0.7 s after the timing.

At a second moment, that is, a moment (t+1), at which the D2D station broadcasts the second DDM, if the neighborhood information in the DNL of the D2D station remains unchanged, that is, $K_n^{t+1} = K_n^t$, it indicates that the neighboring members at the second moment is the same as that at the first moment. That is, the neighboring environment of the D2D station is stable. The D2D station may again determine, on a basis of the basic broadcast time interval at the first moment, the actual time interval for sending the second DDM, so that the determined actual time interval is longer than the initial time interval at the first moment. A specific manner of determining the actual time interval again may also be executed according to the foregoing solution provided in this embodiment. Specifically, the basic broadcast time interval is set to $T_d^{(t+1)*} = 2^c \cdot T^*_{d\ min}$, where c is a counter, and $c_{t+1} = c_t + 1$. At the moment t, $c_t = 0$. At the moment (t+1), $c_{t+1} = 1$. Therefore, at the moment (t+1), $T_d^{(t+1)*} = 2*1 = 2$. In this way, $T_d^{t+1}$ at the second moment is correspondingly increased to $T_d^{t+1} \in [1, 2]$, for example, a value of d may be 1.6 s.

It should be noted that, after broadcasting the second DDM for a first time at the moment t, the D2D station broadcasts the second DDM at the interval of 0.7 s for a second time, that is, performs second-time broadcasting at the moment (t+1). During a period from the moment t to the moment (t+1), the D2D station may receive a first DDM sent by a D2D neighbor, and store the corresponding sending party in the neighborhood list. If a neighboring member is added to the DNL compared with an empty state at the very beginning moment, $T^*_d$ remains to be $T^*_{d\ min}$, and a value of $T_d$ is still obtained randomly, for example, $T_d$ is 0.8 s. Then, the D2D station broadcasts the second DDM at the interval of 0.8 s for another time. After 0.8 s elapses, a third moment, that is, a moment (t+2), at which the second DDM is broadcast comes. At this moment, the D2D station continues to determine the neighboring environment, to adjust $T_d$. In addition, if the neighboring environment of the D2D station remains stable, at a moment (t+i) at which the second DDM is broadcast, if $T_d^{(t+i)*} = 2^c \cdot T^*_{d\ min} > T^*_{d\ max}$, the D2D station sets $T_d^{(t+i)*} = T^*_{d\ max}$, and $T_d^{t+i} \in [T^*_{d\ max}/2, T^*_{d\ max}]$. That is, the actual time interval for broadcasting the second DDM does not exceed $T^*_{d\ max}$, to ensure that D2D discovery can be performed effectively in the BSS.

When the neighboring environment in the DNL of the D2D station is unstable, for example, compared with a previous moment (t+i−1), at the moment (t+i) at which the second DDM is broadcast, the neighboring members in the DNL of the D2D station change, that is, $K_n^{t+i} \neq K_n^{t+i-1}$, the D2D station provided in this embodiment sets the basic broadcast time interval at the current moment, that is, at the moment (t+1), to $T_d^{(t+i)*}=T^*_{d\ min}$, so as to randomly re-select an initial time interval for broadcasting the second DDM.

Another specific example is used to describe the specific manner of performing D2D discovery by the D2D station in this embodiment. FIG. 2 is also a schematic diagram of the D2D station, according to the embodiment shown in FIG. 5 and FIG. 6, in a BSS architecture. An STA2 is used as an example to describe a specific procedure of D2D discovery.

Assuming that after an STA1, the STA2, and an STA3 access an AP, after calculating respective DDM broadcast time intervals, the STA1, the STA2, and the STA3 respectively broadcast a DDM at moments $T_{d-1}^t$, $T_{d-2}^t$, and $T_{d-3}^t$, where $T_{d-1}^t < T_{d-2}^t < T_{d-3}^t$ is set. A specific procedure of performing D2D discovery by the STA2 is as follows:

Step 1: Before broadcasting a DDM of the STA2 for a first time, that is, before broadcasting the second DDM, the STA2 receives a first DDM that is broadcast by the STA1, and adds, to a DNL of the STA2, user information of the STA1 in the received first DDM and quality of a link between the STA1 and the STA2. That is, a neighboring member of the STA2 is $K_2=\{STA_1\}$. The STA2 broadcasts the second DDM at the moment $T_{d-2}^t$. At this moment, because a member in the neighboring member $K_2$ of the STA2 changes to $\{STA_1\}$ from $\phi$ at the moment when the STA2 accesses the AP, and the neighboring environment changes, the basic broadcast time interval is reset to $T_{d-2}^{(t+1)*}=T^*_{d\ min}$, which is used to calculate an actual time interval for broadcasting the second DDM next time.

It should be noted that $T_{d-1}^t<T_{d-2}^t$ in this embodiment. Therefore, after the STA2 first receives the first DDM that is broadcast by the STA1, and adds the user information and the link quality to the DNL of the STA2 according to the first DDM, the STA2 performs initial-moment broadcasting of the second DDM of the STA2. If $T_{d-1}^t<T_{d-2}^t$ in this embodiment, after the STA2 first broadcasts the second DDM at an initial moment, the STA receives the first DDM that is broadcast by the STA1, and adds the user information and the link quality to the DNL of the STA2 according to the first DDM. Therefore, all the embodiments of the present invention do not limit a sequence of broadcasting, by the sending module 14 of the D2D station, the second DDM at the initial moment for a first time and obtaining, by the obtaining module 12, link information of the neighboring station for a first time.

Step 2: After broadcasting the second DDM at the moment $T_{d-2}^t$, the STA2 receives a first DDM that is broadcast by the STA3, and the neighboring member of the STA2 is updated to $K_2=\{STA_1,STA_3\}$. The STA$_2$ broadcasts, according to a calculation result in step 1, the second DDM at a next moment, that is, at a moment $T_{d-2}^{t+1}$. At the moment $T_{d-2}^{t+1}$, members in the neighboring member $K_2$ of the STA2 change from $\{STA_1\}$ at the moment $T_{d-2}^t$ to $\{STA_1,STA_3\}$. That is, the neighboring environment changes. The basic broadcast time interval needs to be reset to $T_{d-2}^{(t+2)*}=T^*_{d\ min}$, which is used to calculate an actual time interval for broadcasting the second DDM next time.

Step 3: The STA2 broadcasts the second DDM at the moment $T_{d-2}^{t+2}$ according to a calculation result in step 2. At this moment, the neighboring environment of the STA2 is stable, that is, the neighboring member $K_2=\{STA_1,STA_3\}$ of the STA2 remains unchanged. The STA2 determines the basic broadcast time interval as $T_{d-2}^{(t+3)*}=2^c \cdot T^*_{d\ min}$, which is used to calculate a time interval for broadcasting the second DDM next time, where c=1.

Step 4: If $K_2$ remains stable, repeat step 3, that is, $T^*_{d-2}$ is exponentially increased to a maximum value: $T_{d-2}^{(t+i)*}=T^*_{d\ max}$; or if $K_2$ changes, $T_{d-2}^{(t+i)*}$ is initialized to $T_{d-2}^{(t+i)*}=T^*_{d\ min}$.

Further, in the D2D station provided in this embodiment, the receiving module 11 is further configured to receive a first indication message sent by the AP that the D2D station accesses. The first indication message includes timeslot information of a BSS to which the D2D station belongs, where the timeslot information is an uplink timeslot and a downlink timeslot that are scheduled by the BSS. The sending module 14 is configured to send, at the second preset power and only in the uplink timeslot of the BSS according to the first indication message received by the receiving module 11, the second DDM at the time interval determined by the time determining module 13.

Figure 7:
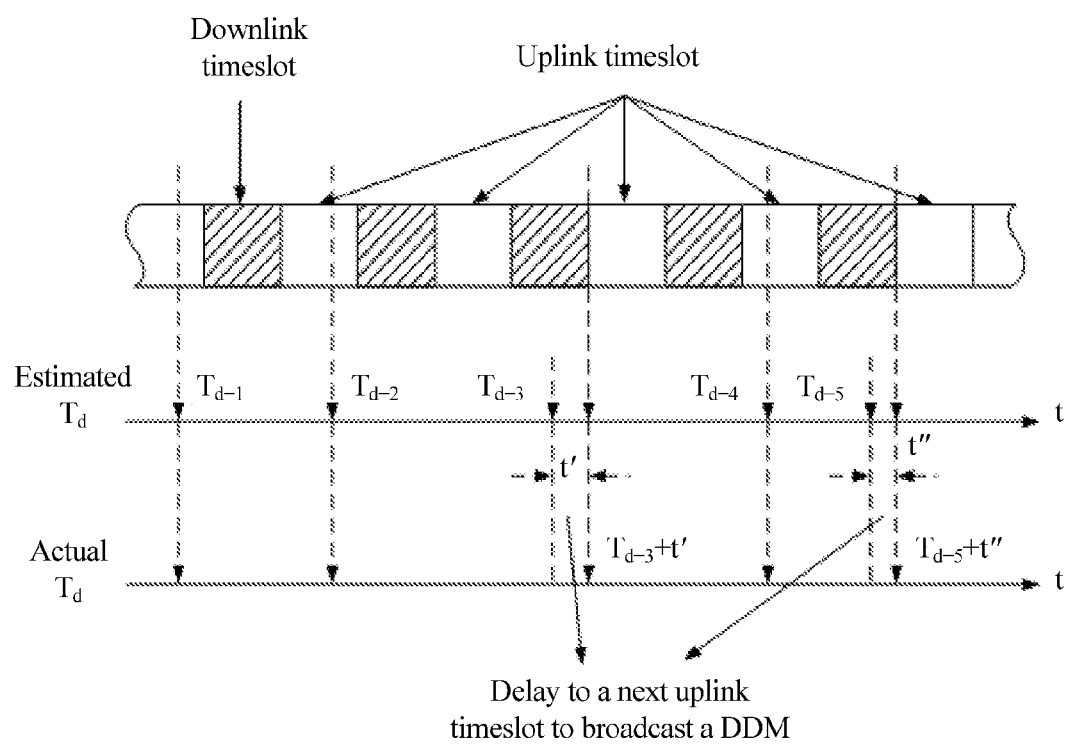
FIG. 7 is a schematic diagram of broadcasting a DDM by a D2D station according to the embodiments shown in FIG. 5 and FIG. 6.

In this embodiment, both the D2D station and the neighboring station access the BSS by using the AP. In a scheduling mode of the AP, for example, in an orthogonal frequency division multiple access (OFDMA) system, the D2D station learns, according to the first indication message sent by the AP, the uplink and downlink timeslots scheduled by the BSS to which the D2D station belongs. Specifically, it may set that the D2D station broadcasts the second DDM only in the uplink timeslot of the BSS. If a moment at which the second DDM is broadcast does not belong to the uplink timeslot of the BSS, the moment at which the second DDM is broadcast needs to be delayed, and the second DDM is not broadcast until a next uplink timeslot of the BSS reaches. As shown in FIG. 7, FIG. 7 is a schematic diagram of broadcasting a DDM by the D2D station according to the embodiment shown in FIG. 5 and FIG. 6. Moments $T_{d-1}$, $T_{d-2}$, and $T_{d-4}$ all are within the uplink timeslot of the BSS. Therefore, the D2D station can separately broadcast the second DDM at the moments $T_{d-1}$, $T_{d-2}$, and $T_{d-4}$. However, moments $T_{d-3}$ and $T_{d-5}$ are within the downlink timeslot of the BSS. Therefore, the moments $T_{d-3}$ and $T_{d-5}$ need to be delayed by t' and t'' respectively until a next uplink timeslot of the BSS reaches, and then the second DDM is broadcast. For the D2D station provided in this embodiment, it is specified that a moment at which the D2D station broadcasts the second DDM is within an uplink timeslot of the BSS, which helps reduce additional overheads in a system compared with a prior-art D2D discovery manner in which DDM sending and receiving both need to occupy a specific proportion of valid resources.

Figure 8:
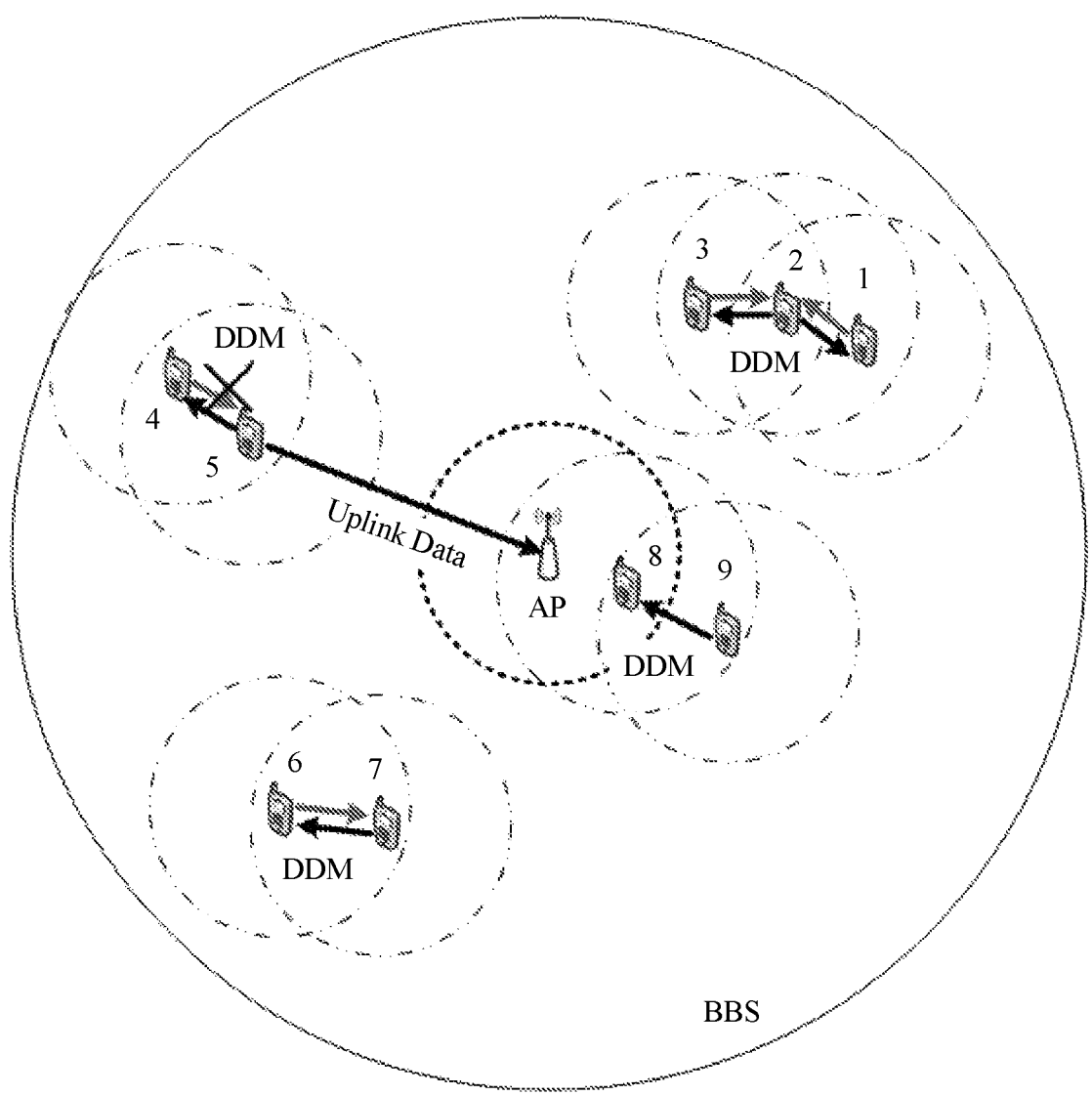
FIG. 8 is a schematic diagram of a D2D station, according to the embodiments shown in FIG. 5 and FIG. 6, in a BSS architecture.

For example, FIG. 8 is a schematic diagram of the D2D station, according to the embodiment shown in FIG. 5 and FIG. 6, in a BSS architecture. FIG. 8 is used as an example to describe that the D2D station broadcasts a second DDM only in an uplink timeslot of the BSS. Specifically, stations STA1 to STA9 all are stations with a D2D discovery capability. The STA1 to STA9 all are stations that are idle in the uplink timeslot of the BSS. Therefore, a DDM is broadcast only in the uplink timeslot of the BSS. For example, in the uplink timeslot of the BSS, the STA5 is performing uplink data transmission, and other D2D stations (the STA1 to STA4 and the STA6 to STA9) have no uplink service. If a broadcasting moment $T_d$ of a D2D station, for example, the STA4, reaches in the uplink timeslot, the STA4 can perform DDM broadcasting. Because the STA5 is performing uplink data transmission, the STA5 does not receive a DDM that is broadcast by the STA4, and the STA5 does not broadcast a DDM in the uplink timeslot either. Therefore, the STA5 is not included in a DNL of a neighboring member of the STA5, that is, the STA4.

It should be noted that the D2D station in the BSS cannot send and receive data simultaneously, and cannot send data information and broadcast a DDM simultaneously either. Generally, the D2D station preferably sends data information. In addition, only small-range D2D discovery is performed between the D2D stations in this embodiment. That is, transmit powers used by the D2D stations to broadcast DDMs all are preset small powers.

Further, in this embodiment, the second DDM may further include power information of sending the second DDM. The receiving module 11 of the D2D station is further configured to receive a second indication message sent by the AP that the D2D station accesses. The second indication message is an indication message sent to the D2D station according to the power information of the second DDM when the AP receives the second DDM. The second indication message is used to indicate that the D2D station falls within coverage of the second preset power used by the AP to send data. Correspondingly, the D2D station provided in this embodiment further includes a disabling module, configured to disable a D2D discovery function of the D2D station according to the second indication message received by the receiving module 11, so that the D2D station does not cause interference to the AP when broadcasting the second DDM at the second preset power. In this way, D2D discovery can be effectively performed. Similarly, the first DDM in this embodiment may include power information of sending the first DDM. The neighboring station may also disable a D2D discovery function of the neighboring station according to a received indication message sent by an AP that the neighboring station accesses. The indication message is an indication message sent to the neighboring station according to the power information of the first DDM when the AP receives the first DDM. The indication message is used to indicate that the neighboring station falls within coverage of the first preset power used by the AP to send data.

FIG. 8 is also used as an example to describe a specific position, in the BSS, of the D2D station that broadcasts a DDM in the BSS. As shown in FIG. 8, because all the stations broadcast a DDM by using a preset small transmit power, coverage of the transmit power is relatively small. Therefore, most of the stations do not cause interference to the AP when broadcasting a DDM in an uplink timeslot of the BSS, uplink resources in the BSS are not wasted, and additional resource consumption during D2D discovery is greatly reduced. If a D2D station, for example, the STA8, that broadcasts a DDM is too close to the AP, when the AP sends data by using a transmit power used by the STA8 to broadcast a DDM, the STA8, apparently, falls within coverage of the transmit power of the AP. In consideration of an interference factor, it is specified that the STA8 cannot perform D2D discovery, that is, the STA8 cannot broadcast a DDM. Therefore, the STA9 cannot detect the STA8 and cannot use the STA8 as a D2D neighbor of the STA9. That is, the STA8 is not included in a DNL of the STA9.

Embodiment 3

Figure 9:
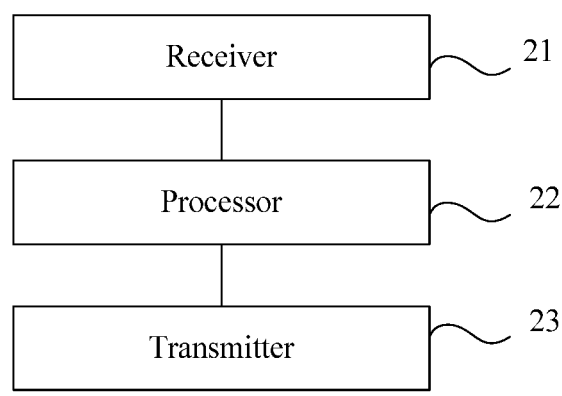
FIG. 9 is a schematic structural diagram of a D2D station according to Embodiment 3 of the present invention.

FIG. 9 is a schematic structural diagram of a D2D station according to Embodiment 3 of the present invention. The D2D station in this embodiment is applicable to performing D2D discovery. The D2D station may be implemented in a manner of hardware and software, which may be integrated into a memory of the D2D station, for example, integrated into a processor chip, for being invoked and executed by a processor. The D2D station in this embodiment includes: a receiver 21, a processor 22, and a transmitter 23.

The receiver 21 is configured to receive a first DDM that is broadcast by a neighboring station at a first preset power, where the first DDM includes user information of the neighboring station.

It should be noted that, FIG. 2 is also a schematic diagram of the D2D station, according to the embodiment shown in FIG. 9, in a BSS architecture. The station described in this embodiment and stations specifically applied in this embodiment, that are, station (STA) 1 to STA9, are stations with a D2D function, that are, stations that can perform D2D discovery. There may be one or more neighboring stations in this embodiment. Therefore, the D2D station provided in this embodiment may receive one or more first DDMs. All stations that fall within coverage of a transmit power of the D2D station are the neighboring stations. In addition, in this embodiment, a receiving party and a sending party of a first DDM can be mutually replaceable. That is, the STA2 in FIG. 2 may be the D2D station that receives the first DDM, or may be the neighboring station that sends the first DDM.

The processor 22 is configured to obtain information about a link between the D2D station and the neighboring station according to the first DDM received by the receiver 21.

The processor 22 is further configured to determine, according to the obtained information about the link between the D2D station and the neighboring station, a time interval for broadcasting a second DDM.

It should be noted that FIG. 3 is also a schematic diagram of a DDM format according to the embodiment shown in FIG. 9. Specifically, the DDM shown in FIG. 3 may be the first DDM received by the D2D station in this embodiment, or may be the second DDM sent by the D2D station. Formats of DDMs broadcast by all D2D stations in the BSS during D2D discovery are the same.

The transmitter 23 is configured to broadcast, at a second preset power, the second DDM at the time interval determined by the processor 22.

It should be noted that, similar to the foregoing embodiment, in this embodiment, the second preset power used by the D2D station to send the second DDM may be the same as or different from the first preset power used by the neighboring station to send the first DDM. Specifically, in this embodiment, values of the second preset power used by the D2D station to send the second DDM and the first preset power used by the neighboring station to send the first DDM may be, for example, 40% to 50% of a normal transmit power used by a transmit station to send data information. For another example, coverage diameters of the first and the second preset powers may be ¼ of a coverage diameter of the BSS.

The D2D station provided in this embodiment of the present invention is an entity apparatus corresponding to the D2D station provided in the embodiment shown in FIG. 1 of the present invention. Entity components thereof are corresponding to modular functions of the network device provided in this embodiment of the present invention. Implementation principles and technical effects thereof are similar, and details are not described herein again.

Figure 10:
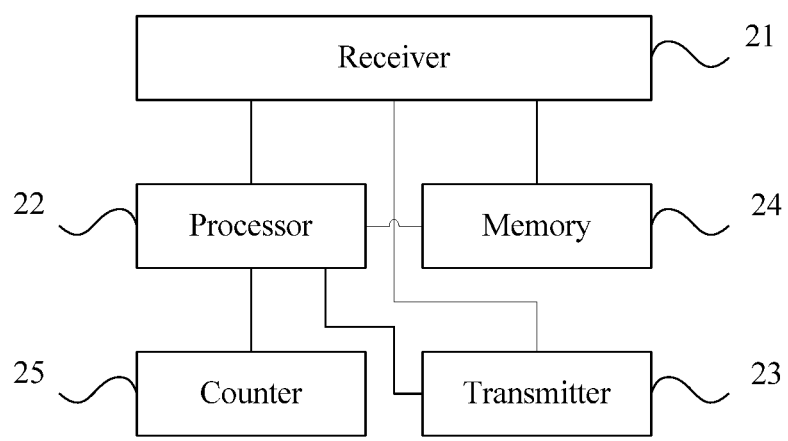
FIG. 10 is a schematic structural diagram of another D2D station according to an embodiment of the present invention.

FIG. 10 is a schematic structural diagram of another D2D station according to this embodiment of the present invention. As shown in FIG. 10, on a basis of the structure of the D2D station provided in the foregoing embodiment shown in FIG. 9, in the D2D station provided in this embodiment, the processor 22 is further configured to calculate quality of the link between the D2D station and the neighboring station according to the user information of the neighboring station that is received by the receiver 21. Correspondingly, the D2D station further includes a memory 24, configured to store, in a DNL of the D2D station, the user information of the neighboring station that is received by the receiver 21 and the quality of the link between the D2D station and the neighboring station that is obtained by the processor 22 by means of calculation. Neighborhood information in the DNL includes neighboring members of the D2D station and quality of a link between the D2D station and each neighboring member. Correspondingly, that the processor 22 is configured to determine, according to the obtained information about the link between the D2D station and the neighboring station, a time interval for broadcasting a second DDM includes: determining, according to the neighborhood information stored by the memory 24 in the DNL, the time interval for broadcasting the second DDM.

In this embodiment, specifically, the user information of the neighboring station and the quality of the link between the D2D station and the neighboring station that is obtained by means of calculation are stored in a preset DNL. The DNL may include all neighboring stations, of the D2D station, within coverage of the second preset power, that is, include the neighboring members of the D2D station, and the quality of the link between the D2D station and each neighboring member. Therefore, the DNL can provide relatively accurate D2D link information, which helps the D2D station determine a neighboring environment of the D2D station, and can assist the AP in resource scheduling.

The D2D station provided in this embodiment of the present invention is an entity apparatus corresponding to the D2D station provided in the embodiment shown in FIG. 4 of the present invention. Entity components thereof are corresponding to modular functions of the network device provided in this embodiment of the present invention. Implementation principles and technical effects thereof are similar, and details are not described herein again.

It should be noted that in this embodiment, when the transmitter 23 of the D2D station broadcasts the second D2D for a first time, there is no neighboring member in the DNL of the D2D station, and the D2D station broadcasts the second DDM at an initial time interval determined by the processor 22.

Optionally, in the D2D station provided in this embodiment, a specific manner in which the processor 22 determines the time interval for broadcasting the second DDM may be, for example: determining a basic broadcast time interval at a current moment according to a first time interval and a second time interval that are preset, and the neighborhood information in the DNL, where the basic broadcast time interval at the current moment is between the first time interval and the second time interval; and randomly obtaining, according to the determined basic broadcast time interval, an actual time interval for broadcasting the second DDM at the current moment.

The D2D station provided in this embodiment of the present invention is an entity apparatus corresponding to the D2D station provided in the embodiment shown in FIG. 5 of the present invention. Entity components thereof are corresponding to modular functions of the network device provided in this embodiment of the present invention. Implementation principles and technical effects thereof are similar, and details are not described herein again.

In another possible implementation manner of this embodiment, a specific manner in which the processor 22 determines the time interval for broadcasting the second DDM may also be, for example: at an initial moment at which the second DDM is broadcast, the processor 22 first determines the initial time interval for broadcasting the second DDM by the D2D station; further, the transmitter 23 is further configured to broadcast, at the second preset power, the second DDM at the initial time interval determined by the processor 22; and at a subsequent moment at which the second DDM is broadcast, the processor 22 determines, according to the obtained information about the link between the D2D station and the neighboring station, a subsequent time interval for broadcasting the second DDM, where when the neighborhood information in the DNL remains unchanged, the determined subsequent time interval is a time interval longer than the initial time interval, and the determined subsequent time interval is between a first time interval and a second time interval that are preset.

It should be noted that in the foregoing embodiment, a minimum broadcast time interval for broadcasting a DDM is the first time interval or is obtained according to the first time interval. A maximum broadcast time interval for broadcasting a DDM is the second time interval or is obtained according to the second time interval. The minimum broadcast time interval and the maximum broadcast time interval are usually selected according to empirical values. An extremely small time interval for broadcasting a DDM results in that the D2D station sends a DDM frequently, which causes relatively large energy consumption of the D2D station. An extremely large time interval for broadcasting a DDM results in that the D2D station does not perform D2D discovery when a neighboring member is already changed, which reduces reliability of D2D discovery.

Similarly, according to the D2D station provided in this embodiment, a specific manner in which the processor 22 determines the initial time interval and the subsequent time interval for broadcasting the second DDM may also be: determining a basic broadcast time interval at the initial moment and a basic broadcast time interval at a current moment according to the first time interval, the second time interval, and the neighborhood information in the DNL, where when the neighborhood information in the DNL is the same as that at a previous moment, the basic broadcast time interval at the current moment is a time interval longer than the basic broadcast time interval at the initial moment. Correspondingly, the initial time interval at the initial moment is an initial time interval that is for broadcasting the second DDM and randomly selected by the processor 22 from the determined basic broadcast time interval at the initial moment; and the subsequent time interval at the subsequent moment is an actual time interval that is for broadcasting the second DDM at the current moment and randomly selected by the processor 22 from the determined basic broadcast time interval at the current moment.

The D2D station provided in this embodiment of the present invention is an entity apparatus corresponding to the D2D station provided in the embodiment shown in FIG. 6 of the present invention. Entity components thereof are corresponding to modular functions of the network device provided in this embodiment of the present invention. Implementation principles and technical effects thereof are similar, and details are not described herein again.

An example is used to describe specific manners of determining the basic broadcast time interval and the actual time interval for broadcasting the second DDM in the foregoing embodiment. On a basis of the structure of the D2D station provided in the embodiment shown in FIG. 10, the D2D station provided in this embodiment further includes a counter 25. Specifically, the processor 22 may set, at any moment at which the second DDM is broadcast, the basic broadcast time interval to $T^*_d = 2^c \cdot T^*_{d\ min} \leq T^*_{d\ max} \cdot T^*_d$ is the basic broadcast time interval for broadcasting the second DDM by the D2D station, $T^*_{d\ min}$ is the first time interval, and $T_{d\ max}$ is the second time interval, where the basic broadcast time interval is between the first time interval and the second time interval. The counter 25 is configured to count c in the basic broadcast time interval that is set by the processor 22. It should be noted that at an initial moment at which the second DDM is broadcast, when the neighborhood information in the DNL changes compared with that at a previous moment, the counter 25 sets c to 0; when the neighborhood information in the DNL is the same as that at a previous moment, the counter 25 increases c by 1. If at multiple consecutive moments at which second DDMs are broadcast, the neighborhood information in the DNL remains unchanged, the counter 25 sequentially increases c by 1 at each broadcast moment. Specially, a case in which the counter 25 sets c to 0 includes the following. On one hand, during a basic broadcast time interval at an initial moment for sending the second DDM, c is 0, where, specifically, it is the counter 25 that sets c to 0. Correspondingly, specifically, the processor 22 randomly obtains, according to the determined basic broadcast time interval $T^*_d = T^*_{d\ min}$, the initial time interval for broadcasting the second DDM at the current moment. On the other hand, during a basic broadcast time interval at a subsequent moment for sending the second DDM, c may also be 0, where, specifically, when the neighborhood information in the DNL changes compared with that at a previous moment, it is the counter 25 that sets c to 0. Correspondingly, specifically, the processor 22 randomly obtains, according to the determined basic broadcast time interval $T^*_d = T^*_{d\ min}$, the actual time interval for broadcasting the second DDM at the current moment.

Referring to the process in which $T^*_d$ is used as the basic broadcast time interval to perform D2D discovery in the foregoing embodiment, manners of setting the basic broadcast time interval, the initial time interval, and the subsequent time interval, and specific processes, specific implementation manners, principles, and technical effects that are of performing D2D discovery all are similar, and details are not described by using specific examples herein again.

It should be noted that stations in a BSS architecture shown in FIG. 2 are used as an example for description. An STA1 and an STA2 access an AP. The STA1 and the STA2 can perform mutual D2D discovery, and broadcast respective DDMs. An example that the STA2 is the D2D station in this embodiment is used for description. If an initial broadcast moment of the STA2 is after an initial broadcast moment of the STA1, after the STA2 first receives a first DDM that is broadcast by the STA1, and then adds user information and link quality to a DNL of the STA2 according to the first DDM, the STA2 broadcasts a second DDM of the STA2 at the initial moment. If an initial broadcast moment of the STA2 is before an initial broadcast moment of the STA1, after the STA2 first broadcasts a second DDM at the initial moment, the STA2 receives a first DDM that is broadcast by the STA1, and adds user information and link quality to a DNL of the STA2 according to the first DDM. Therefore, all the embodiments of the present invention do not limit a sequence of broadcasting, by the transmitter 21 of the D2D station, a second DDM at the initial moment for a first time and obtaining, by the processor 22 of the D2D station, link information of the neighboring station for a first time.

Further, in the D2D station provided in this embodiment, the receiver 21 is further configured to receive a first indication message sent by the AP that the D2D station accesses. The first indication message includes timeslot information of a BSS to which the D2D station belongs, where the timeslot information is an uplink timeslot and a downlink timeslot that are scheduled by the BSS. The transmitter 23 is configured to send, at the second preset power and only in the uplink timeslot of the BSS according to the first indication message received by the receiver 21, the second DDM at the time interval determined by the processor 22.

It should be noted that the D2D station in the BSS cannot send and receive data simultaneously, and cannot send data information and broadcast a DDM simultaneously either. Generally, the D2D station preferably sends data information. In addition, only small-range D2D discovery is performed between the D2D stations in this embodiment. That is, transmit powers used by the D2D stations to broadcast DDMs all are preset small powers.

Further, in this embodiment, the second DDM may further include power information of sending the second DDM. The receiver 21 of the D2D station is further configured to receive a second indication message sent by the AP that the D2D station accesses. The second indication message is an indication message sent to the D2D station according to the power information of the second DDM when the AP receives the second DDM. The second indication message is used to indicate that the D2D station falls within coverage of the second preset power used by the AP to send data. Correspondingly, the processor 22 is further configured to disable a D2D discovery function of the D2D station according to the second indication message received by the receiver 21, so that the D2D station does not cause interference to the AP when broadcasting the second DDM at the second preset power. In this way, D2D discovery can be effectively performed. Similarly, the first DDM in this embodiment may include power information of sending the first DDM. The first station may also disable a D2D discovery function of the neighboring station according to a received indication message sent by an AP that the first station accesses. The indication message is an indication message sent to the first station according to the power information of the first DDM when the AP receives the first DDM. The indication message is used to indicate that the first station falls within coverage of the first preset power used by the AP to send data.

Embodiment 4

Figure 11:
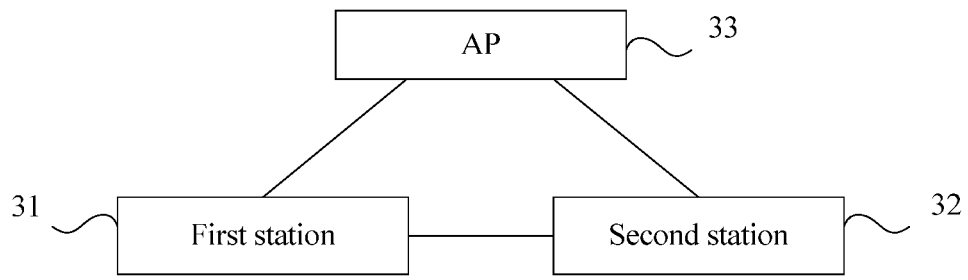
FIG. 11 is a schematic structural diagram of a D2D discovery system according to Embodiment 4 of the present invention.

FIG. 11 is a schematic structural diagram of a D2D discovery system according to Embodiment 4 of the present invention. As shown in FIG. 11, the D2D discovery system of this embodiment includes: a first station 31, a second station 32, and an AP 33. The first station 31 and the second station 32 both access a BSS by using the AP 33.

The second station 32 is configured to broadcast a first DDM at a first preset power, where the first DDM includes user information of the second station.

The first station 31 is configured to receive the first DDM that is broadcast by the second station.

It should be noted that, FIG. 2 is also a schematic diagram of the stations, according to the embodiment shown in FIG. 11, in a BSS architecture. The stations described in this embodiment and stations specifically applied in this embodiment, that are, station (STA) 1 to STA9, are stations with a D2D function, that are, stations that can perform D2D discovery. There may be one or more second stations 32 in this embodiment. Therefore, the first station 31 provided in this embodiment may receive one or more first DDMs. All stations that fall within coverage of the first transmit power are the second stations 32. In addition, in this embodiment, a receiving party and a sending party of a first DDM can be mutually replaceable. That is, the STA2 in FIG. 2 may be the first station 31 that receives the first DDM or may be the second station 32 that sends the first DDM.

The first station 31 is further configured to obtain information about a link between the first station 31 and the second station 32 according to the received first DDM.

The first station 31 is further configured to determine, according to the obtained information about the link between the first station 31 and a second station 32, a time interval for broadcasting a second DDM.

It should be noted that, as shown in FIG. 3, FIG. 3 is also a schematic diagram of a DDM format according to the embodiment shown in FIG. 11. Specifically, the DDM shown in FIG. 3 may be the first DDM received by the first station 31 in this embodiment, or may be the second DDM sent by the first station 31. Formats of DDMs broadcast by all stations in the BSS during D2D discovery are the same.

The first station 31 is further configured to broadcast the second DDM at the determined time interval at a second preset power.

It should be noted that, similar to the foregoing embodiment, in this embodiment, the second preset power used by the first station 31 to send the second DDM may be the same as or different from the first preset power used by the second station 32 to send the first DDM. Specifically, in this embodiment, values of the second preset power used by the first station 31 to send the second DDM and the first preset power used by the second station 32 to send the first DDM may be, for example, 40% to 50% of a normal transmit power used by a transmit station to send data information. For another example, coverage diameters of the first and the second preset powers may be ¼ of a coverage diameter of the BSS.

The D2D discovery system provided in this embodiment of the present invention is a discovery system that includes the D2D station provided in the embodiment shown in FIG. 1 of the present invention. Implementation principles and technical effects thereof are similar, and details are not described herein again.

Further, in the D2D discovery system provided in this embodiment, that the first station 31 is configured to obtain information about a link between the first station 31 and the second station 32 according to the received first DDM includes: calculating quality of the link between the first station 31 and the second station 32 according to the received user information of the second station 32, and storing, in a D2D neighborhood list DNL of the first station 31, the received user information of the second station 32 and the quality of the link between the first station 31 and the second station 32 that is obtained by means of calculation. Neighborhood information in the DNL includes neighboring members of the first station 31 and quality of a link between the first station 31 and each neighboring member. Correspondingly, that the first station 31 is configured to determine, according to the obtained information about the link between the first station 31 and the second station 32, a time interval for broadcasting a second DDM includes: determining, according to the neighborhood information in the DNL, the time interval for broadcasting the second DDM.

In this embodiment, specifically, the user information of the second station 32 and the quality of the link between the first station 31 and the second station 32 that is obtained by means of calculation are stored in a preset DNL. The DNL may include all second stations 32 within coverage of the second preset power of the first station 31, that is, include the neighboring members of the first station 31, and the quality of the link between the first station 31 and each neighboring member. Therefore, the DNL can provide relatively accurate D2D link information, which helps the D2D station determine a neighboring environment of the first station 31, and can assist the AP in resource scheduling.

The D2D discovery system provided in this embodiment of the present invention is a discovery system that includes the D2D station provided in the embodiment shown in FIG. 4 of the present invention. Implementation principles and technical effects thereof are similar, and details are not described herein again.

It should be noted that in this embodiment, when the first station 31 broadcasts the second D2D for a first time, there is no neighboring member in the DNL of the first station 31, and the first station 31 broadcasts the second DDM at an initial time interval determined by the first station 31.

Optionally, in the D2D discovery system provided in this embodiment, a specific manner in which the first station 31 determines the time interval for broadcasting the second DDM may be, for example: determining a basic broadcast time interval at a current moment according to a first time interval and a second time interval that are preset, and the neighborhood information in the DNL, where the basic broadcast time interval at the current moment is between the first time interval and the second time interval; and randomly obtaining, according to the determined basic broadcast time interval, an actual time interval for broadcasting the second DDM at the current moment.

The D2D discovery system provided in this embodiment of the present invention is a discovery system that includes the D2D station provided in the embodiment shown in FIG. 5 of the present invention. Implementation principles and technical effects thereof are similar, and details are not described herein again.

In another possible implementation manner of this embodiment, a specific manner in which the first station 31 determines the time interval for broadcasting the second DDM may also be, for example: at an initial moment at which the second DDM is broadcast, determining the initial time interval for broadcasting the second DDM, where correspondingly, the first station 31 is configured to: broadcast the second DDM at the determined initial time interval at the second preset power; and at a subsequent moment at which the second DDM is broadcast, determining, according to the obtained information about the link between the first station 31 and the second station 32, a subsequent time interval for broadcasting the second DDM, where when the neighborhood information in the DNL remains unchanged, the determined subsequent time interval is a time interval longer than the initial time interval, and the determined subsequent time interval is between a first time interval and a second time interval that are preset.

It should be noted that in the foregoing embodiment, a minimum broadcast time interval for broadcasting a DDM is the first time interval or is obtained according to the first time interval. A maximum broadcast time interval for broadcasting a DDM is the second time interval or is obtained according to the second time interval. The minimum broadcast time interval and the maximum broadcast time interval are usually selected according to empirical values. An extremely small time interval for broadcasting a DDM results in that the first station 31 sends a DDM frequently, which causes relatively large energy consumption of the first station 31. An extremely large time interval for broadcasting a DDM results in that the first station 31 does not perform D2D discovery when a neighboring member is already changed, which reduces reliability of D2D discovery.

Similarly, in the D2D discovery system provided in this embodiment, the first station 31 is further configured to determine a basic broadcast time interval at the initial moment and a basic broadcast time interval at a current moment according to the first time interval, the second time interval, and the neighborhood information in the DNL, where when the neighborhood information in the DNL is the same as that at a previous moment, the basic broadcast time interval at the current moment is a time interval longer than the basic broadcast time interval at the initial moment. Correspondingly, the initial time interval at the initial moment is an initial time interval that is for broadcasting the second DDM and randomly selected by the first station 31 from the determined basic broadcast time interval at the initial moment; and the subsequent time interval at the subsequent moment is an actual time interval that is for broadcasting the second DDM at the current moment and randomly selected by the first station 31 from the determined basic broadcast time interval at the current moment.

The D2D discovery system provided in this embodiment of the present invention is a discovery system that includes the D2D station provided in the embodiment shown in FIG. 6 of the present invention. Implementation principles and technical effects thereof are similar, and details are not described herein again.

An example is used to describe specific implementation manners in which the first station 31 determines the basic broadcast time interval and the actual time interval for sending the second DDM. The first station 31 may set, at any moment at which the second DDM is broadcast, the basic broadcast time interval to $T^*_d = 2^c \cdot T^*_{d\ min} \le T^*_{d\ max}$. $T^*_d$ is the basic broadcast time interval for broadcasting the second DDM by the D2D station, $T^*_{d\ min}$ is the first time interval, and $T^*_{d\ max}$ is the second time interval, where the basic broadcast time interval is between the first time interval and the second time interval. The first station 31 is further configured to count c. It should be noted that at an initial moment at which the second DDM is broadcast, when the neighborhood information in the DNL changes compared with that at a previous moment, the first station 31 sets c to 0; or when the neighborhood information in the DNL is the same as that at a previous moment, the first station 31 increases c by 1. If at multiple consecutive moments at which second DDMs are broadcast, the neighborhood information in the DNL all remains unchanged, the first station 31 sequentially increases c by 1 at each broadcast moment. Specially, a case in which the first station 31 sets c to 0 includes the following. On one hand, during a basic broadcast time interval at an initial moment for sending the second DDM, c is 0, where, specifically, it is the first station 31 that sets c to 0, and further randomly obtains, according to the determined basic broadcast time interval $T^*_d = T^*_{d\ min}$, the initial time interval for broadcasting the second DDM at the current moment. On the other hand, during a basic broadcast time interval at a subsequent moment for sending the second DDM, c may also be 0, where, specifically, when the neighborhood information in the DNL changes compared with that at a previous moment, it is the first station 31 that sets c to 0, and further randomly obtains, according to the determined basic broadcast time interval $T^*_d = T^*_{d\ min}$, the actual time interval for broadcasting the second DDM at the current moment.

Referring to the process in which $T^*_d$ is used as the basic broadcast time interval to perform D2D discovery in the foregoing embodiment, manners of setting the basic broadcast time interval, the initial time interval, and the subsequent time interval, and specific processes, specific implementation manners, principles, and technical effects that are of performing D2D discovery all are similar, and details are not described by using specific examples herein again.

It should be noted that stations in a BSS architecture shown in FIG. 2 are used as an example for description. An STA1 and an STA2 both access an AP. The STA1 and the STA2 can perform mutual D2D discovery, and broadcast respective DDMs. An example that the STA2 is the first station 31 in this embodiment and the STA1 is the second station 32 in this embodiment is used for description. If an initial broadcast moment of the STA2 is after an initial broadcast moment of the STA1, after the STA2 first receives a first DDM that is broadcast by the STA1, and then adds user information and link quality to a DNL of the STA2 according to the first DDM, the STA2 broadcasts a second DDM of the STA2 at the initial moment. If an initial broadcast moment of the STA2 is before an initial broadcast moment of the STA1, after the STA2 first broadcasts a second DDM at the initial moment, the STA2 receives a first DDM that is broadcast by the STA1, and adds user information and link quality to a DNL of the STA2 according to the first DDM. Therefore, all the embodiments of the present invention do not limit a sequence of broadcasting, by the first station 31, the second DDM at the initial moment for a first time and obtaining, by the first station 31, link information of the second station 32 for a first time.

Further, in the D2D discovery system provided in this embodiment, the AP 33 is configured to separately send a first indication message to the first station 31 and the second station 32. The first indication message includes timeslot information of a BSS to which the first station 31 and the second station 32 belong.

The first station 31 and the second station 32 are further separately configured to receive the first indication message.

Correspondingly, that the second station 32 is configured to broadcast a first DDM at a first preset power includes: sending the first DDM only in an uplink timeslot of the BSS according to the first indication message at the first preset power. Similarly, that the first station 31 is configured to broadcast a second DDM at a determined time interval at a second preset power includes: sending, only in the uplink timeslot of the BSS according to the first indication message, the first DDM at the determined time interval at the second preset power.

It should be noted that neither the first station 31 nor the second station 32 in the BSS can send and receive data simultaneously, or send data information and broadcast a DDM simultaneously. Generally, the foregoing station preferably sends data information. In addition, only small-range D2D discovery is performed between the stations in the D2D discovery system in this embodiment. That is, transmit powers used by the stations in the foregoing embodiment to broadcast DDMs both are preset small powers.

Further, in this embodiment, the first DDM and the second DDM may further include power information of sending the foregoing DDMs. The AP 33 is further configured to: receive the first DDM sent by the second station 32, send a second indication message to the second station 32 according to the power information of the first DDM, receive the second DDM sent by the first station 31, and send a third indication message to the first station 31 according to the power information of the second DDM. The second indication message is used to indicate that the second station 32 falls within coverage of the first preset power used by the AP 33 to send data. The third indication message is used to indicate that the first station 31 falls within coverage of the second preset power used by the AP 33 to send data. Correspondingly, the second station 32 is further configured to: receive the second indication message sent by the AP 33, and disable a D2D discovery function of the second station 32 according to an indication of the second indication message, so that the second station 32 does not cause interference to the AP 33 when broadcasting the first DDM at the first preset power. Similarly, the first station 31 is further configured to: receive the third indication message sent by the AP 33, and disable a D2D discovery function of the first station 31 according to an indication of the third indication message, so that the first station 31 does not cause interference to the AP 33 when broadcasting the second DDM at the second preset power. In this way, D2D discovery can be effectively performed in the D2D discovery system.

Embodiment 5

Figure 12:
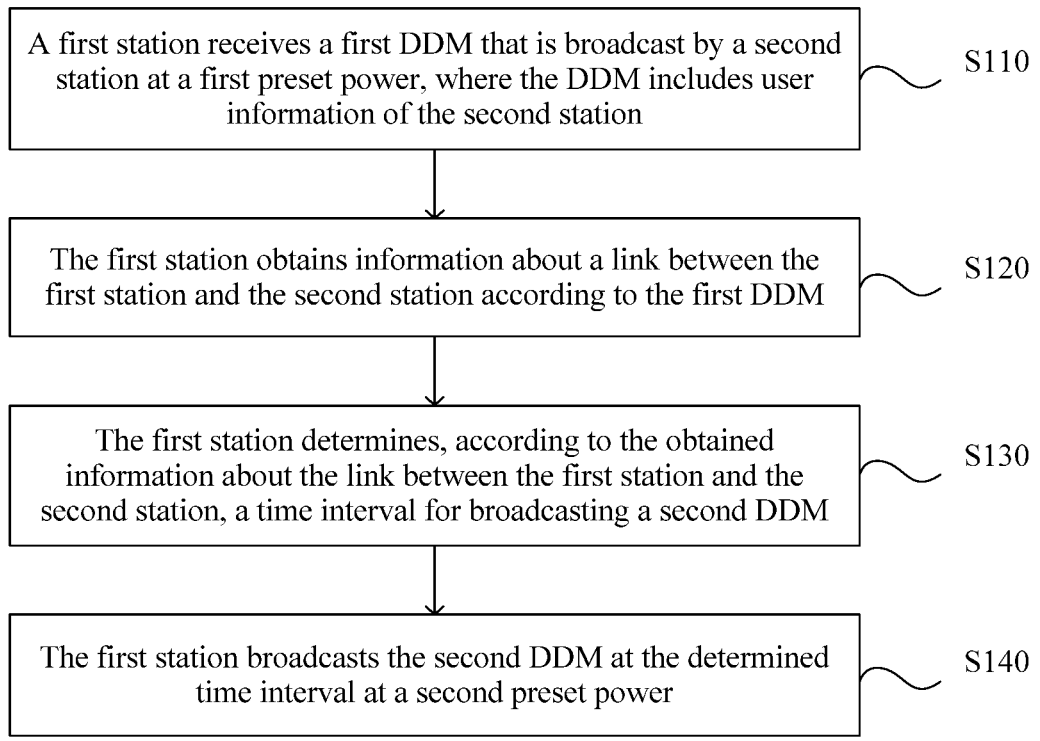
FIG. 12 is a flowchart of a D2D discovery method according to Embodiment 5 of the present invention.

FIG. 12 is a flowchart of a D2D discovery method according to Embodiment 5 of the present invention. The method provided in this embodiment is applicable to performing D2D discovery. The method may be executed by a first station. The first station is generally implemented in a manner of hardware and software, which may be integrated into a memory of the first station, for example, integrated into a processor chip, for being invoked and executed by a processor. The method in this embodiment includes the following steps.

S110. The first station receives a first DDM that is broadcast by a second station at a first preset power, where the DDM includes user information of the second station.

In this embodiment, the first station and the second station both access a BSS by using an AP. FIG. 2 is also a schematic diagram of the stations, according to the embodiment shown in FIG. 12, in a BSS architecture. The station described in this embodiment and stations specifically applied in this embodiment, that are, station (STA) 1 to STA9, are stations with a D2D function, that are, stations that can perform D2D discovery. There may be one or more second stations in this embodiment. Therefore, the first station provided in this embodiment may receive one or more first DDMs. All stations that fall within coverage of the first transmit power are the second stations. In addition, in this embodiment, a receiving party and a sending party of a first DDM can be mutually replaceable. That is, the STA2 in FIG. 2 may be the first station that receives the first DDM, or may be the second station that sends the first DDM.

S120. The first station obtains information about a link between the first station and the second station according to the first DDM.

S130. The first station determines, according to the obtained information about the link between the first station and the second station, a time interval for broadcasting a second DDM.

It should be noted that, as shown in FIG. 3, FIG. 3 is also a schematic diagram of a DDM format according to the embodiment shown in FIG. 12. Specifically, the DDM shown in FIG. 3 may be the first DDM received by the first station in this embodiment, or may be the second DDM sent by the first station. Formats of DDMs broadcast by all stations in the BSS during D2D discovery are the same.

S140. The first station broadcasts the second DDM at the determined time interval at a second preset power.

It should be noted that, similar to the foregoing embodiment, in this embodiment, the second preset power used by the first station to send the second DDM may be the same as or different from the first preset power used by the second station to send the first DDM. Specifically, in this embodiment, values of the second preset power used by the first station to send the second DDM and the first preset power used by the second station to send the first DDM may be, for example, 40% to 50% of a normal transmit power used by a transmit station to send data information. For another example, coverage diameters of the first and the second preset powers may be ¼ of a coverage diameter of the BSS.

It should be noted that in this embodiment, the broadcasting of a second DDM and the receiving of a first DDM by the first station are executed cyclically. Specifically, the first station broadcasts the second DDM at a determined time interval. When falling within coverage of the second preset power of the second station, the first station receives the first DDM that is repeatedly broadcast by the second station.

The D2D discovery method provided in this embodiment of the present invention may be executed by the D2D station provided in the embodiment shown in FIG. 1 of the present invention. Steps of the method are corresponding to modular functions of the D2D station provided in the embodiments of the present invention. Implementation principles and technical effects thereof are similar, and details are not described herein again.

Figure 13:
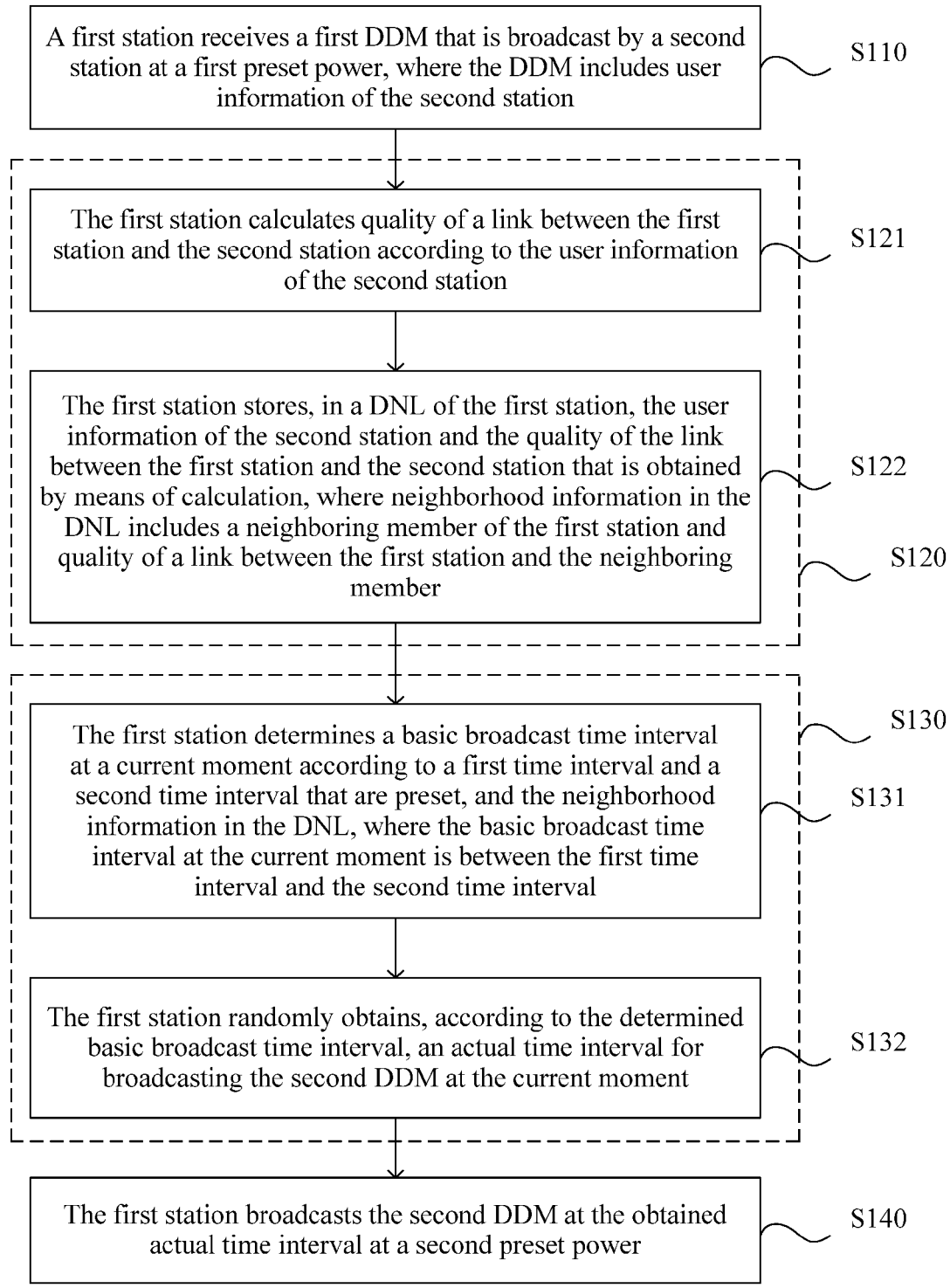
FIG. 13 is a flowchart of another D2D discovery method according to an embodiment of the present invention.

Further, FIG. 13 is a flowchart of another D2D discovery method according to this embodiment of the present invention. In the D2D discovery method provided in this embodiment, S120 may include: S121 in which the first station calculates quality of the link between the first station and the second station according to user information of the second station; and S122 in which the first station stores, in a D2D neighborhood list DNL of the first station, the user information of the second station and the quality of the link between the first station and the second station that is obtained by means of calculation, where neighborhood information in the DNL includes neighboring members of the first station and quality of a link between the first station and each neighboring member. Correspondingly, S130 is replaced with the following: the first station determines, according to the neighborhood information in the DNL, a time interval for broadcasting the second DDM.

In this embodiment, specifically, the user information of the second station and the quality of the link between the first station and the second station that is obtained by means of calculation are stored in a preset DNL. The DNL may include all second stations within coverage of the second preset power of the first station, that is, include the neighboring members of the first station, and the quality of the link between the first station and each neighboring member. Therefore, the DNL can provide relatively accurate D2D link information, which helps the D2D station determine a neighboring environment of the first station, and can assist an AP in resource scheduling.

The D2D discovery method provided in this embodiment of the present invention may be executed by the D2D station provided in the embodiment shown in FIG. 4 of the present invention. Steps of the method are corresponding to modular functions of the D2D station provided in the embodiments of the present invention. Implementation principles and technical effects thereof are similar, and details are not described herein again.

It should be noted that in this embodiment, when the first station broadcasts the second D2D for a first time, there is no neighboring member in the DNL of the first station, and the first station broadcasts the second DDM at an initial time interval determined by the first station.

Optionally, on a basis of the foregoing embodiment shown in FIG. 13, in the method provided in this embodiment, S130 may include: S131 in which the first station determines a basic broadcast time interval at a current moment according to a first time interval and a second time interval that are preset, and the neighborhood information in the DNL, where the basic broadcast time interval at the current moment is between the first time interval and the second time interval; and S132 in which the first station randomly obtains, according to the determined basic broadcast time interval, an actual time interval for broadcasting the second DDM at the current moment. Correspondingly, S140 is replaced with the following: the first station broadcasts the second DDM at the obtained actual time interval at a second preset power.

The D2D discovery method provided in this embodiment of the present invention may be executed by the D2D station provided in the embodiment shown in FIG. 5 of the present invention. Steps of the method are corresponding to modular functions of the D2D station provided in the embodiments of the present invention. Implementation principles and technical effects thereof are similar, and details are not described herein again.

Embodiment 6

Figure 14:
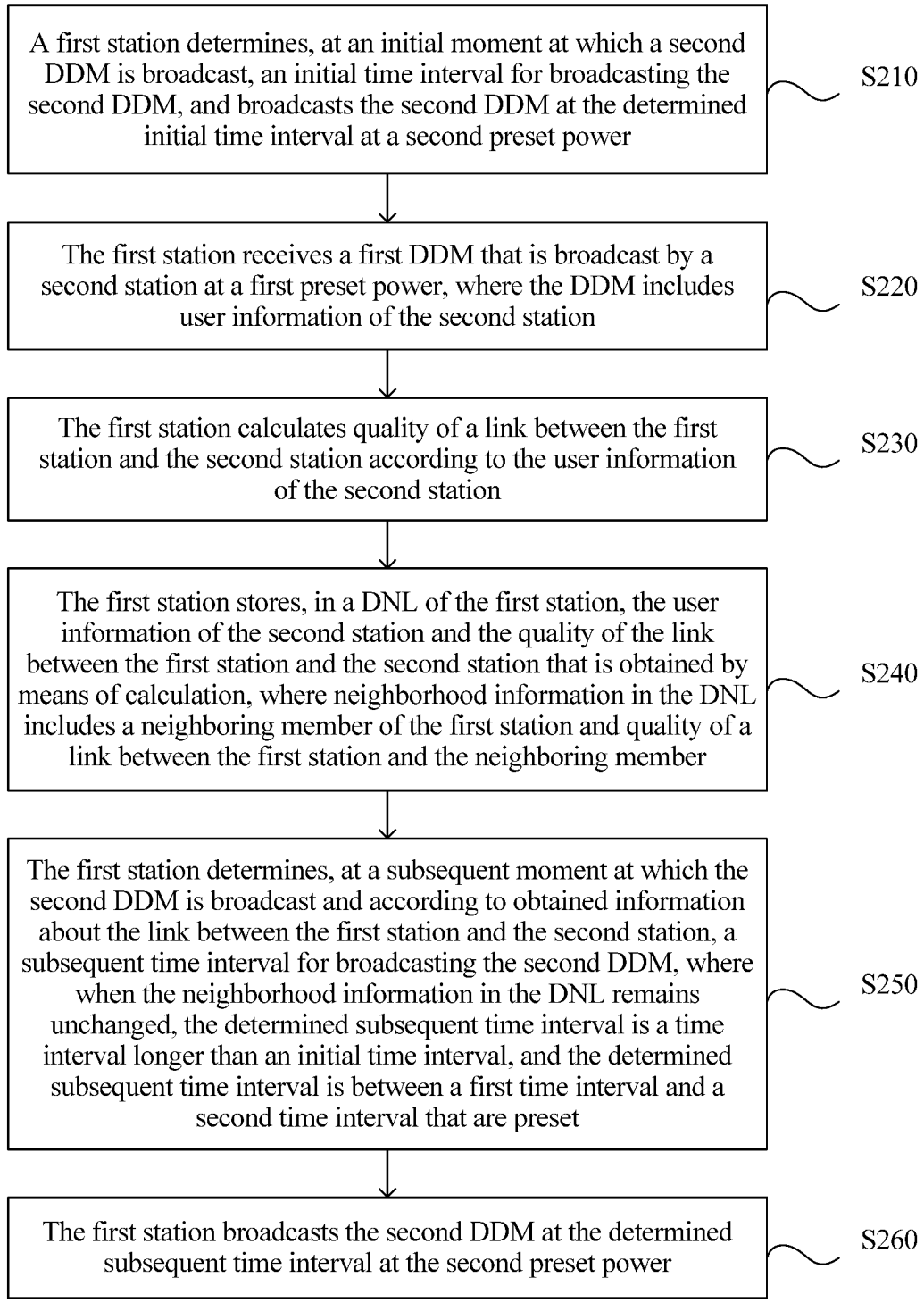
FIG. 14 is a flowchart of a D2D discovery method according to Embodiment 6 of the present invention.

FIG. 14 is a flowchart of a D2D discovery method according to Embodiment 6 of the present invention. The method provided in this embodiment includes the following steps.

S210. A first station determines, at an initial moment at which a second DDM is broadcast, an initial time interval for broadcasting the second DDM, and broadcasts the second DDM at the determined initial time interval at a second preset power.

S220. The first station receives a first DDM that is broadcast by a second station at a first preset power, where the DDM includes user information of the second station.

S230. The first station calculates quality of a link between the first station and the second station according to the user information of the second station.

S240. The first station stores, in a D2D neighborhood list DNL of the first station, the user information of the second station and the quality of the link between the first station and the second station that is obtained by means of calculation, where neighborhood information in the DNL includes a neighboring member of the first station and quality of a link between the first station and the neighboring member.

Specifically, for a specific implementation manner of S220 to S240, reference may be made to Silo to S122 in the embodiment shown in FIG. 13. It should be noted that the method provided in the present invention does not limit a sequence of S210 and S220 to S240. That S210 is executed before S220 to S240 is used as an example for illustration in this embodiment.

It should be noted that stations in a BSS architecture shown in FIG. 2 are used as an example for description. An STA1 and an STA2 both access an AP. The STA1 and the STA2 can perform mutual D2D discovery, and broadcast respective DDMs. An example that the STA2 is the first station in this embodiment and the STA1 is the second station in this embodiment is used for description. If an initial broadcast moment of the STA2 is after an initial broadcast moment of the STA1, after the STA2 first receives a first DDM that is broadcast by the STA1, and then adds user information and link quality to a DNL of the STA2 according to the first DDM, the STA2 broadcasts a second DDM of the STA2 at the initial moment. If an initial broadcast moment of the STA2 is before an initial broadcast moment of the STA1, after the STA 2 first broadcasts a second DDM at the initial moment, the STA2 receives a first DDM that is broadcast by the STA1, and adds user information and link quality to a DNL of the STA2 according to the first DDM. Therefore, all the embodiments of the present invention do not limit a sequence of broadcasting, by the first station, a second DDM at the initial moment for a first time and obtaining, by the first station, link information of the second station for a first time.

S250. The first station determines, at a subsequent moment at which the second DDM is broadcast and according to obtained information about the link between the first station and the second station, a subsequent time interval for broadcasting the second DDM, where when the neighborhood information in the DNL remains unchanged, the determined subsequent time interval is a time interval longer than an initial time interval, and the determined subsequent time interval is between a first time interval and a second time interval that are preset.

S260. The first station broadcasts the second DDM at the determined subsequent time interval at the second preset power.

It should be noted that in the foregoing embodiment, a minimum broadcast time interval for broadcasting a DDM is the first time interval or is obtained according to the first time interval. A maximum broadcast time interval for broadcasting a DDM is the second time interval or is obtained according to the second time interval. The minimum broadcast time interval and the maximum broadcast time interval are usually selected according to empirical values. An extremely small time interval for broadcasting a DDM results in that the first station sends a DDM frequently, which causes relatively large energy consumption of the first station. An extremely large time interval for broadcasting a DDM results in that the first station does not perform D2D discovery when a neighboring member is already changed, which reduces reliability of D2D discovery.

Figure 15A:
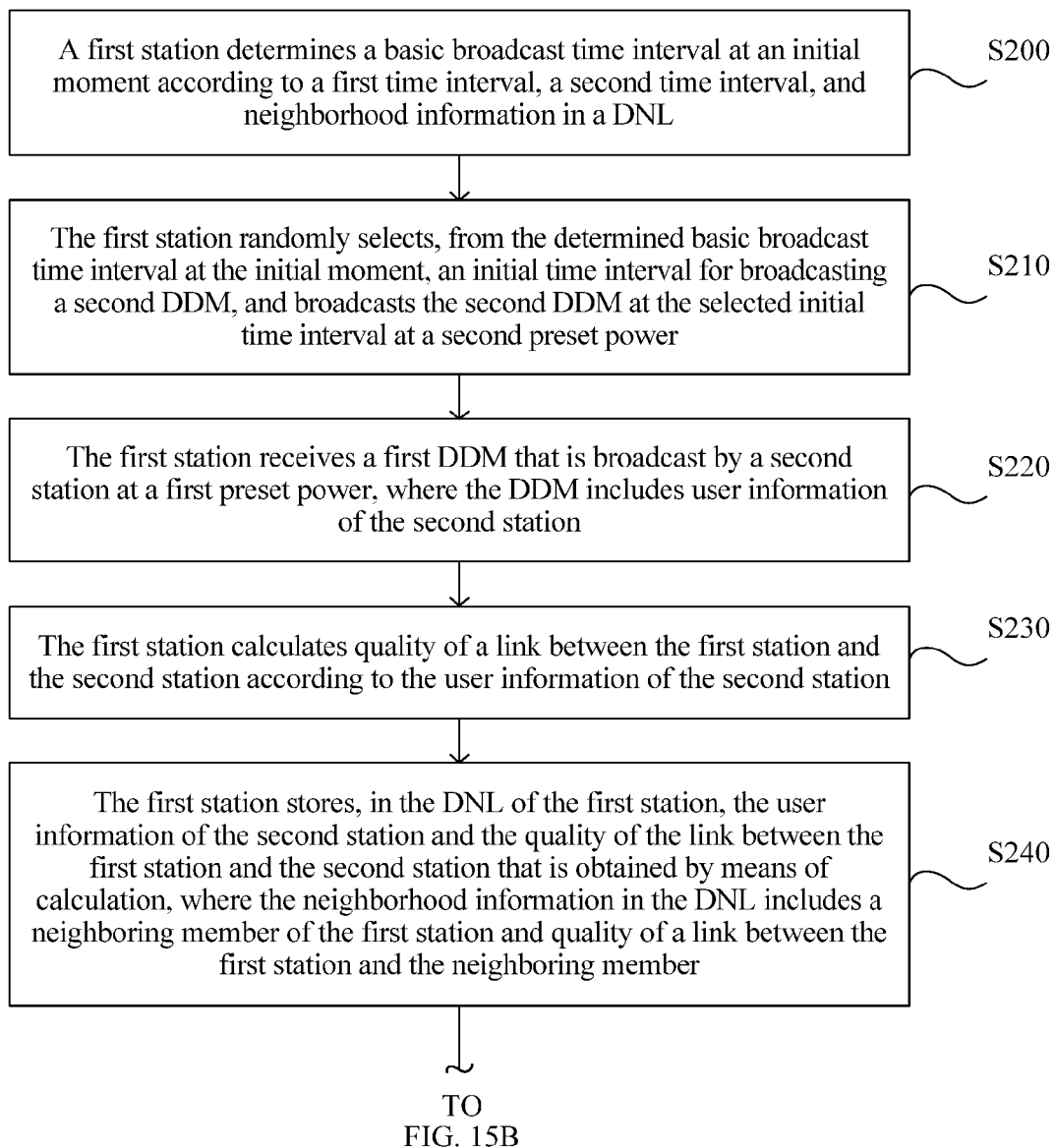
FIG. 15A and FIG. 15B are a flowchart of another D2D discovery method according to an embodiment of the present invention.
Figure 15B:
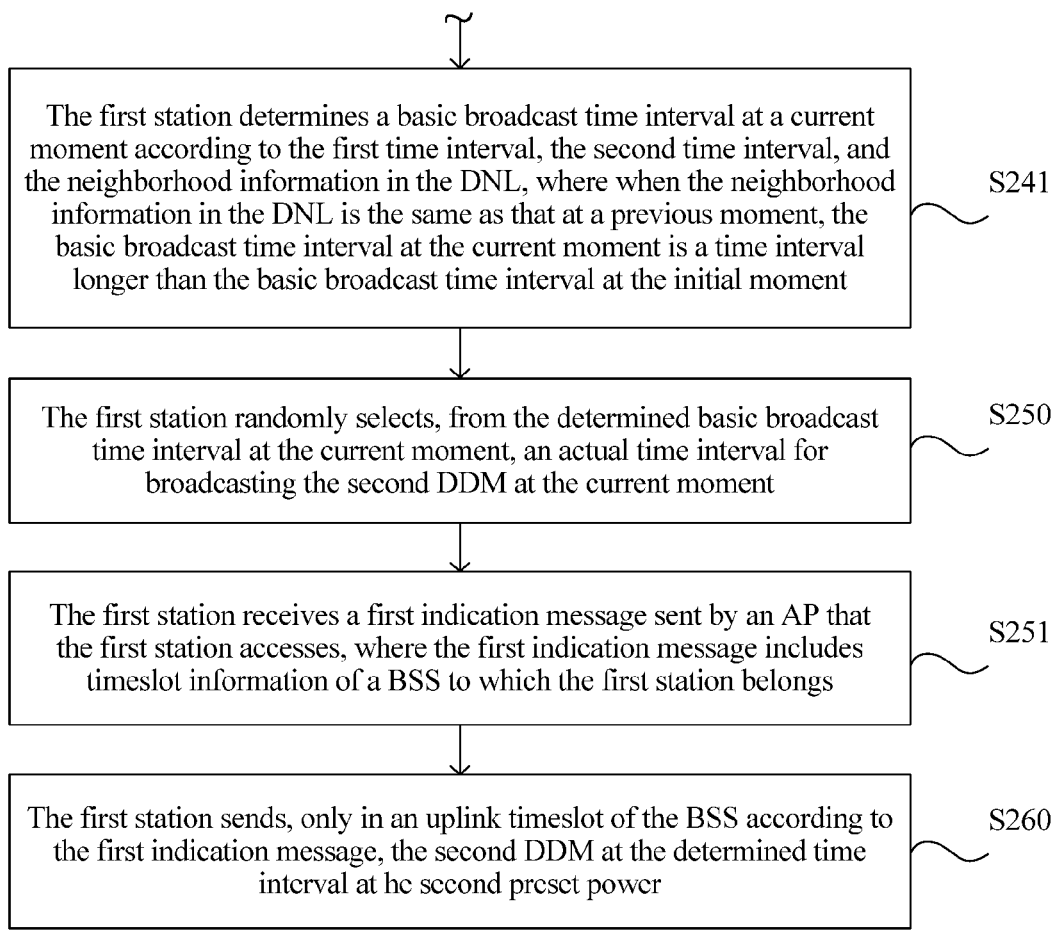

FIG. 15A and FIG. 15B are a flowchart of another D2D discovery method according to this embodiment of the present invention. On a basis of the method provided in the embodiment shown in FIG. 14, before S210, the method provided in this embodiment further includes: S200 in which a first station determines a basic broadcast time interval at the initial moment according to a first time interval, a second time interval, and neighborhood information in a DNL. Correspondingly, S210 is replaced with the following: the first station randomly selects, from the determined basic broadcast time interval at the initial moment, an initial time interval for broadcasting the second DDM, and broadcasts the second DDM at the selected initial time interval at a second preset power. Similarly, before S250, the method further includes: S241 in which the first station determines a basic broadcast time interval at a current moment according to the first time interval, the second time interval, and neighborhood information in the DNL, where when the neighborhood information in the DNL is the same as that at a previous moment, the basic broadcast time interval at the current moment is a time interval longer than the basic broadcast time interval at the initial moment. Correspondingly, S250 is replaced with the following: the first station randomly selects, from the determined basic broadcast time interval at the current moment, an actual time interval for broadcasting the second DDM at the current moment.

The D2D discovery method provided in this embodiment of the present invention may be executed by the D2D station provided in the embodiment shown in FIG. 6 of the present invention. Steps of the method are corresponding to modular functions of the D2D station provided in the embodiments of the present invention. Implementation principles and technical effects thereof are similar, and details are not described herein again.

An example is used to describe specific implementation manners in which the first station determines the basic broadcast time interval and the actual time interval for sending the second DDM. At any moment at which the first station broadcasts the second DDM, the first station may set the basic broadcast time interval to $T^*_d = 2^c \cdot T^*_{d\ min} \leq T^*_{d\ max}$. $T^*_d$ is the basic broadcast time interval for broadcasting the second DDM by the D2D station, $T^*_{d\ min}$ is the first time interval, $T^*_{d\ max}$ is the second time interval, and c is a counter, where the basic broadcast time interval is between the first time interval and the second time interval. It should be noted that at the initial moment at which the second DDM is broadcast, when the neighborhood information in the DNL changes compared with that at a previous moment, c is set to 0; or when the neighborhood information in the DNL is the same as that at a previous moment, c is increased by 1. If at multiple consecutive moments at which second DDMs are broadcast, the neighborhood information in the DNL all remains unchanged, c is sequentially increased by 1 at each broadcast moment.

Referring to the process in which $T^*_d$ is used as the basic broadcast time interval to perform D2D discovery in the foregoing embodiment, manners of setting the basic broadcast time interval, the initial time interval, and the subsequent time interval, and specific processes, specific implementation manners, principles, and technical effects that are of performing D2D discovery all are similar, and details are not described by using specific examples herein again.

Further, the D2D discovery method provided in this embodiment further includes: S251 in which the first station receives a first indication message sent by an AP that the first station accesses, where the first indication message includes timeslot information of a BSS to which the first station belongs. Correspondingly, S260 is replaced with the following: the first station sends, only in an uplink timeslot of the BSS according to the first indication message, the second DDM at the determined time interval at the second preset power. It should be noted that in the method provided in the present invention, an execution sequence of S251 is not limited. After receiving the first indication message sent by the AP, the first station broadcasts the second DDM only in the uplink timeslot of the BSS according to a timeslot indicated in the message. That S251 is executed before S260 is used as an example for illustration in the embodiment shown in FIG. 15A and FIG. 15B. If the first station already receives the first indication message before S200, the first station broadcasts the second DDM at the initial moment in a same manner.

It should be noted that neither the first station nor the second station in the BSS can send and receive data simultaneously, or send data information and broadcast a DDM simultaneously. Generally, the foregoing station preferably sends data information. In addition, only small-range D2D discovery is performed between the stations in the D2D discovery system in this embodiment. That is, transmit powers used by the stations in the foregoing embodiment to broadcast DDMs both are preset small powers.

Further, in this embodiment, the second DDM may further include power information of sending the second DDM. The method provided in this embodiment further includes: the first station receives a second indication message sent by the AP that the station accesses. The second indication message is an indication message sent to the first station according to the power information of the second DDM when the AP receives the second DDM. The second indication message is used to indicate that the first station falls within coverage of the second preset power used by the AP to send data. Correspondingly, the method provided in this embodiment further includes: the first station disables a D2D discovery function of the first station according to the second indication message. In this way, D2D discovery can be effectively performed in the D2D discovery system. Similarly, the first DDM in this embodiment may include power information of sending the first DDM. The second station may disable a D2D discovery function of the second station according to a received indication message sent by the AP that the second station accesses. The indication message is an indication message sent to the second station according to the power information of the first DDM when the AP receives the first DDM. The indication message is used to indicate that the second station falls within coverage of the first preset power used by the AP to send data.

Embodiment 7

Figure 16:
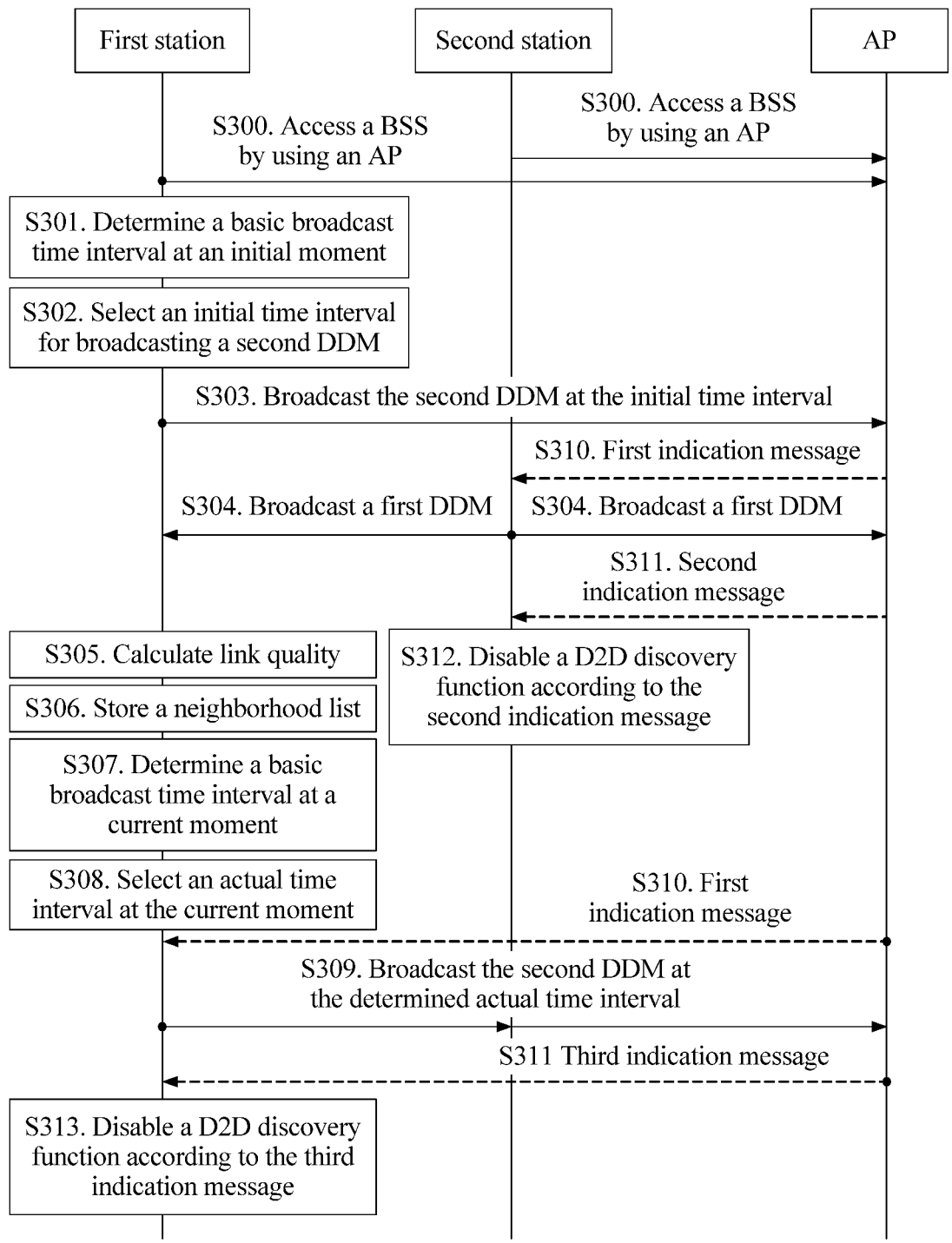
FIG. 16 is a flowchart of a D2D discovery method according to Embodiment 7 of the present invention.

FIG. 16 is a flowchart of a D2D discovery method according to Embodiment 7 of the present invention. The method provided in this embodiment includes:

S300: A first station and a second station both access a BSS by using an AP.

S301: The first station determines a basic broadcast time interval at an initial moment according to a first time interval and a second time interval that are preset, and neighborhood information in a DNL.

S302: The first station randomly selects, from the determined basic broadcast time interval at the initial moment, an initial time interval for broadcasting the second DDM.

S303: The first station broadcasts the second DDM at the selected initial time interval at a second preset power.

S304: The second station broadcasts a first DDM at a first preset power, where the first DDM includes user information of the second station.

S305: The first station calculates quality of a link between the first station and the second station according to the user information of the second station.

S306: The first station stores, in the D2D neighborhood list DNL of the first station, the user information of the second station and the quality of the link between the first station and the second station that is obtained by means of calculation, where neighborhood information in the DNL includes a neighboring member of the first station and quality of a link between the first station and the neighboring member.

It should be noted that the method provided in this embodiment does not limit a sequence of S301 to S303 and S304 to S306. That S301 to S303 are executed before S304 to S306 is used as an example for illustration in this embodiment.

S307: The first station determines a basic broadcast time interval at a current moment according to the first time interval, the second time interval, and the neighborhood information in the DNL, where when the neighborhood information in the DNL is the same as that at a previous moment, the basic broadcast time interval at the current moment is a time interval longer than the basic broadcast time interval at the initial moment.

S308: The first station randomly selects, from the determined basic broadcast time interval at the current moment, an actual time interval for broadcasting the second DDM at the current moment, where when the neighborhood information in the DNL remains unchanged, the determined actual time interval is a time interval longer than the initial time interval, and the determined actual time interval is between the first time interval and the second time interval that are preset.

S309: The first station broadcasts the second DDM at the determined actual time interval at the second preset power.

Further, the method provided in this embodiment further includes: S310 in which the AP separately sends a first indication message to the first station and the second station, where the first indication message includes timeslot information of a BSS to which the first station and the second station belong.

It should be noted that this embodiment does not limit an execution sequence of S310. If the second station receives, before S304, the first indication message sent by the AP, S304 is replaced with the following: the second station broadcasts, only in an uplink timeslot of a BSS according to the first indication message, the first DDM at a first preset power.

Similarly, if the first station receives, before S309, the first indication message sent by the AP, S309 is replaced with the following: the first station broadcasts, only in an uplink timeslot of a BSS according to the first indication message, the second DDM at the determined actual time interval at the second preset power. If the first station receives, before S303, the first indication message sent by the AP, S303 is replaced with the following: the first station broadcasts, only in an uplink timeslot of a BSS according to the first indication message, the second DDM at the selected initial time interval at a second preset power.

Optionally, in this embodiment, the first DDM and the second DDM may further include power information of sending the foregoing DDMs. Correspondingly, the method provided in this embodiment further includes:

S311: After receiving the first DDM and the second DDM, the AP sends a second indication message to the second station according to the power information of the first DDM, and/or sends a third indication message to the first station according to the power information of the second DDM, where the second indication message is used to indicate that the second station falls within coverage of the first preset power used by the AP to send data, and the third indication message is used to indicate that the first station falls within coverage of the second preset power used by the AP to send data.

S312: The second station receives the second indication message sent by the AP, and disables a D2D discovery function of the second station according to the second indication message.

S313. The first station receives the third indication message sent by the AP, and disables a D2D discovery function of the first station according to the third indication message.

It should be noted that the method provided in the present invention does not limit an execution sequence of S312 and S313. That S312 is executed before S312 is used as an example for illustration in this embodiment. In addition, in this embodiment, the broadcasting of a second DDM and the receiving of a first DDM by the first station are executed cyclically, and the broadcasting of a first DDM and the receiving of a second DDM by the second station are executed cyclically. The first station is used as an example for description. The first station broadcasts the second DDM at a time interval that is at a current moment and determined by the first station. When falling within coverage of the second preset power of the second station, the first station receives the first DDM that is repeatedly broadcast by the second station. Manners of broadcasting the first DDM by the second station and broadcasting the second DDM by the first station and beneficial effects thereof are similar, and details are not further described herein.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended to describe the technical solutions of the present invention, but not to limit the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A device-to-device (D2D) station, comprising:
   a processor; and
   a non-transitory computer-readable medium storing a program to be executed by the processor, the program including instructions to:
   receive a first D2D discovery message (DDM) that is broadcast by a neighboring station at a first preset power, wherein the first DDM comprises user information of the neighboring station;
   obtain information about a link between the D2D station and the neighboring station according to the first DDM;
   determine, according to the information that is about the link between the D2D station and the neighboring station, a time interval for broadcasting a second DDM, wherein the time interval is randomly obtained according to a preset time period and a quality of a link between the D2D station and the neighboring station; and
   broadcast, at a second preset power, the second DDM at the time interval.

2. The D2D station according to claim 1, wherein the instructions to obtain information about the link between the D2D station and the neighboring station include instructions to:
   calculate the quality of the link between the D2D station and the neighboring station according to the user information of the neighboring station; and
   store, in a D2D neighborhood list (DNL) of the D2D station, the user information of the neighboring station and the quality of the link between the D2D station and the neighboring station, wherein neighborhood information in the DNL comprises a neighboring member of the D2D station and the quality of the link between the D2D station and the neighboring member;

wherein the instructions to determine the time interval for broadcasting the second DDM include instructions to determine, according to the neighborhood information in the DNL, the time interval for broadcasting the second DDM.

3. The D2D station according to claim 2, wherein the instructions to determine the time interval for broadcasting the second DDM include instructions to:

determine a basic broadcast time interval at a current moment according to a first time interval and a second time interval that are preset, and the neighborhood information in the DNL, wherein the basic broadcast time interval at the current moment is between the first time interval and the second time interval; and obtain, randomly and according to the basic broadcast time interval, an actual time interval for broadcasting the second DDM at the current moment.

4. The D2D station according to claim 3, wherein the instructions to determine the basic broadcast time interval include instructions to, at any moment at which the second DDM is broadcast, set the basic broadcast time interval to $T^*_d = 2^c \cdot T^*_{d\,min} \leq T^*_{d\,max}$;

wherein $T^*_d$ is the basic broadcast time interval for broadcasting the second DDM by the D2D station, $T^*_{d\,min}$ is the time interval, $T^*_{d\,max}$ is the second time interval, and c is a counter;

wherein the basic broadcast time interval is between the first time interval and the second time interval, and at an initial moment at which the second DDM is broadcast, when the neighborhood information in the DNL changes compared with that at a previous moment, c is set to 0, and when the neighborhood information in the DNL is the same as that at a previous moment, c is increased by 1.

5. The D2D station according to claim 2, wherein the instructions to determine the time interval for broadcasting the second DDM include instructions to:

determine an initial time interval for broadcasting the second DDM by the D2D station, and broadcast, at the second preset power, the second DDM at the initial time interval; and determine, according to the information that is about the link between the D2D station and the neighboring station, a subsequent time interval for broadcasting the second DDM, wherein when the neighborhood information in the DNL remains unchanged, the determined subsequent time interval is a time interval longer than the initial time interval, and the determined subsequent time interval is between a first time interval and a second time interval that are preset.

6. The D2D station according to claim 5, wherein the instructions to determine the time interval for broadcasting the second DDM further include instructions to:

determine a basic broadcast time interval at an initial moment and a basic broadcast time interval at a current moment according to the first time interval, the second time interval, and the neighborhood information in the DNL, wherein when the neighborhood information in the DNL is the same as that at a previous moment, the basic broadcast time interval at the current moment is a time interval longer than the basic broadcast time interval at the initial moment;

wherein the instructions to determine the initial time interval for broadcasting the second DDM include instructions to randomly select, from the basic broadcast time interval at the initial moment, the initial time interval for broadcasting the second DDM; and wherein the instructions to determine the subsequent time interval for broadcasting the second DDM include instructions to randomly select, from the basic broadcast time interval at the current moment, an actual time interval for broadcasting the second DDM at the current moment.

7. The D2D station according to claim 1, wherein the first DDM and the second DDM each comprise a flag, an identity (ID) of a station that sends the DDM, an ID of a basic service set (BSS) to which the station sending the DDM belongs, a preferable channel option of the station that sends the DDM, and reserved information.

8. A device-to-device (D2D) discovery system, comprising a first station;

a second station; and an access point (AP), wherein the first station and the second station both are configured to access a basic service set (BSS) by using the AP;

wherein the second station is configured to broadcast a first device-to-device D2D discovery message DDM at a first preset power, wherein the first DDM comprises user information of the second station;

wherein the first station is configured to receive the first DDM that is broadcast by the second station;

wherein the first station is further configured to obtain information about a link between the first station and the second station according to the received first DDM;

wherein the first station is further configured to determine, according to the obtained information about the link between the first station and the second station, a time interval for broadcasting a second DDM, wherein the time interval is randomly obtained according to a preset time period and a quality of a link between the first station and the second station; and wherein the first station is further configured to broadcast the second DDM at the determined time interval at a second preset power.

9. The system according to claim 8, wherein the first station is configured to obtain information about a link between the first station and the second station according to the received first DDM by:

calculating the quality of the link between the first station and the second station according to the user information of the second station; and storing, in a D2D neighborhood list (DNL) of the first station, the user information of the second station and the quality of the link between the first station and the second station that is obtained by calculation, wherein neighborhood information in the DNL comprises a neighboring member of the first station and quality of a link between the first station and the neighboring member; and wherein the first station is configured to determine, according to the obtained information about the link between the first station and the second station, a time interval for broadcasting a second DDM by determining, according to the neighborhood information in the DNL, the time interval for broadcasting the second DDM.

10. The system according to claim 9, wherein that the first station is further configured to determine, according to the obtained information about the link between the first station and the second station, a time interval for broadcasting a second DDM by:

determining a basic broadcast time interval at a current moment according to a first time interval and a second time interval that are preset, and the neighborhood information in the DNL, wherein the basic broadcast time interval at the current moment is between the first time interval and the second time interval; and randomly obtaining, according to the determined basic broadcast time interval, an actual time interval for broadcasting the second DDM at the current moment.

11. The system according to claim 9, wherein that the first station is further configured to determine, according to the obtained information about the link between the first station and the second station, the time interval for broadcasting the second DDM by:

determining, at an initial moment at which the second DDM is broadcast, an initial time interval for broadcasting the second DDM, wherein correspondingly, the first station is configured to broadcast the second DDM at the determined initial time interval at the second preset power; and determining, at a subsequent moment at which the second DDM is broadcast and according to the obtained information about the link between the first station and the second station, a subsequent time interval for broadcasting the second DDM, wherein when the neighborhood information in the DNL remains unchanged, the determined subsequent time interval is a time interval longer than the initial time interval, and the determined subsequent time interval is between a first time interval and a second time interval that are preset.

12. The system according to claim 11, wherein the first station is further configured to determine a basic broadcast time interval at the initial moment and a basic broadcast time interval at a current moment according to the first time interval, the second time interval, and the neighborhood information in the DNL, wherein when the neighborhood information in the DNL is the same as that at a previous moment, the basic broadcast time interval at the current moment is a time interval longer than the basic broadcast time interval at the initial moment;

wherein the first station is configured to determine an initial time interval for broadcasting the second DDM by randomly selecting, at an initial moment at which the second DDM is broadcast, from the determined basic broadcast time interval at the initial moment, the initial time interval for broadcasting the second DDM; and wherein the first station is configured to determine, at a subsequent moment at which the second DDM is broadcast and according to the obtained information about the link between the first station and the second station, a subsequent time interval for broadcasting the second DDM comprises: randomly selecting, from the determined basic broadcast time interval at the current moment, an actual time interval for broadcasting the second DDM at the current moment.

13. The system according to claim 12, wherein that the first station determines the basic broadcast time interval according to the first time interval, the second time interval, and the neighborhood information in the DNL by setting, at any moment at which the second DDM is broadcast, the basic broadcast time interval to $T^*_d = 2^c \cdot T^*_{d\ min} \leq T^*_{d\ max}$;

wherein $T^*_d$ is the basic broadcast time interval for broadcasting the second DDM by the first station, $T^*_{d\ min}$ is the first time interval, and $T^*_{d\ max}$ is the second time interval, and c is a counter; and wherein the basic broadcast time interval is between the first time interval and the second time interval, the first station is further configured to count c, and at the initial moment at which the second DDM is broadcast, when the neighborhood information in the DNL changes compared with that at a previous moment, the first station sets c to 0, and when the neighborhood information in the DNL is the same as that at a previous moment, the first station increases c by 1.

14. The system according to claim 8, wherein the first DDM and the second DDM each comprise a flag, an identity ID of a station that sends the DDM, an ID of a basic service set BSS to which the station sending the DDM belongs, a preferable channel option of the station that sends the DDM, and reserved information.

15. A device-to-device (D2D) discovery method, comprising:

receiving, by a first station, a first D2D discovery message (DDM) that is broadcast by a second station at a first preset power, wherein the DDM comprises user information of the second station;

obtaining, by the first station, information about a link between the first station and the second station according to the first DDM;

determining, by the first station according to the obtained information about the link between the first station and the second station, a time interval for broadcasting a second DDM, wherein the time interval is randomly obtained according to a preset time period and a quality of a link between the first station and the second station; and broadcasting, by the first station, the second DDM at the determined time interval at a second preset power.

16. The method according to claim 15, wherein the obtaining, by the first station, information about the link between the first station and the second station according to the first DDM comprises:

calculating, by the first station, a quality of the link between the first station and the second station according to the user information of the second station, and storing, by the first station, in a D2D neighborhood list (DNL) of the first station, the user information of the second station and the quality of the link between the first station and the second station that is obtained by calculation, wherein neighborhood information in the DNL comprises a neighboring member of the first station and quality of a link between the first station and the neighboring member; and wherein the determining, by the first station according to the obtained information about the link between the first station and the second station, the time interval for broadcasting the second DDM comprises determining, by the first station according to the neighborhood information in the DNL, the time interval for broadcasting the second DDM.

17. The method according to claim 16, wherein the determining, by the first station according to the obtained information about the link between the first station and the second station, the time interval for broadcasting the second DDM comprises:

determining, by the first station, a basic broadcast time interval at a current moment according to a first time interval and a second time interval that are preset, and the neighborhood information in the DNL, wherein the basic broadcast time interval at the current moment is between the first time interval and the second time interval; and randomly obtaining, by the first station according to the determined basic broadcast time interval, an actual time interval for broadcasting the second DDM at the current moment.

18. The method according to claim 17, wherein the determining, by the first station, the basic broadcast time interval according to the first time interval, the second time interval, and the neighborhood information in the DNL comprises:

setting, by the first station at any moment at which the second DDM is broadcast, the basic broadcast time interval to $T^*_d = 2^c \cdot T^*_{d\ min} \leq T^*_{d\ max}$;

wherein $T^*_d$ is the basic broadcast time interval for broadcasting the second DDM by the first station, $T^*_{d\ min}$ is the first time interval, $T^*_{d\ max}$ is the second time interval, and c is a counter; and wherein the basic broadcast time interval is between the first time interval and the second time interval, and at an initial moment at which the second DDM is broadcast, when the neighborhood information in the DNL changes compared with that at a previous moment, c is set to 0, and when the neighborhood information in the DNL is the same as that at a previous moment, c is increased by 1.

19. The method according to claim 16, wherein the method further comprises:

determining, by the first station at an initial moment at which the second DDM is broadcast, an initial time interval for broadcasting the second DDM, and broadcasting the second DDM at the determined initial time interval at the second preset power; and wherein the determining, by the first station according to the obtained information about the link between the first station and the second station, the time interval for broadcasting a second DDM comprises determining, by the first station, at a subsequent moment at which the second DDM is broadcast, according to the obtained information about the link between the first station and the second station, a subsequent time interval for broadcasting the second DDM, wherein, when the neighborhood information in the DNL remains unchanged, the determined subsequent time interval is a time interval longer than the initial time interval, and the determined subsequent time interval is between a first time interval and a second time interval that are preset.

20. The method according to claim 19, wherein the method further comprises:

before determining the initial time interval for broadcasting the second DDM, determining, by the first station, a basic broadcast time interval at the initial moment according to the first time interval, the second time interval, and the neighborhood information in the DNL; and determining, by the first station and before determining the subsequent moment at which the second DDM is broadcast, a basic broadcast time interval at a current moment according to the first time interval, the second time interval, and the neighborhood information in the DNL, wherein when the neighborhood information in the DNL is the same as that at a previous moment, the basic broadcast time interval at the current moment is a time interval longer than the basic broadcast time interval at the initial moment;

wherein correspondingly, the determining, by the first station at an initial moment at which the second DDM is broadcast, an initial time interval for broadcasting the second DDM comprises: randomly selecting, by the first station, the initial time interval for broadcasting the second DDM from the determined basic broadcast time interval at the initial moment; and wherein the determining, by the first station, at the subsequent moment at which the second DDM is broadcast, according to the obtained information about the link between the first station and the second station, a subsequent time interval for broadcasting the second DDM comprises randomly selecting an actual time interval for broadcasting the second DDM at the current moment from the determined basic broadcast time interval at the current moment.

* * * * *